United States Patent
Huetter et al.

(10) Patent No.: US 11,848,980 B2
(45) Date of Patent: Dec. 19, 2023

(54) DISTRIBUTED PIPELINE CONFIGURATION IN A DISTRIBUTED COMPUTING SYSTEM

(71) Applicant: Boray Data Technology Co. Ltd., Beijing (CN)

(72) Inventors: Raymond John Huetter, Abbotsford (AU); Alka Yamarti, Hyderabad (IN); Craig Alexander McIntyre, Kellyville (AU)

(73) Assignee: BORAY DATA TECHNOLOGY CO. LTD., Beijing (CN)

( * ) Notice: Subject to any disclaimer, the term of this patent is extended or adjusted under 35 U.S.C. 154(b) by 0 days.

(21) Appl. No.: 17/179,149

(22) Filed: Feb. 18, 2021

(65) Prior Publication Data

US 2022/0014584 A1 Jan. 13, 2022

Related U.S. Application Data

(60) Provisional application No. 63/049,920, filed on Jul. 9, 2020.

(51) Int. Cl.
*H04L 67/10* (2022.01)
*G06F 9/48* (2006.01)

(52) U.S. Cl.
CPC .......... *H04L 67/10* (2013.01); *G06F 9/4843* (2013.01)

(58) Field of Classification Search
CPC ..... H04L 67/10; H04L 67/16; H04L 41/0893; H04L 41/5054; H04L 67/28; H04L 67/34; H04L 67/1014; H04L 67/1097; H04L 12/4633; H04L 12/66; H04L 41/0803; H04L 41/0886; H04L 41/5096; H04L 67/101; H04L 67/2833; H04L 67/32; H04L 67/327; H04L 41/5051; H04L 47/125; H04L 47/783; H04L 49/101; H04L 49/90; H04L 49/901; H04L 49/9063; H04L 49/9094; H04L 67/025; H04L 67/1008; H04L 67/1031; H04L 67/1044; H04L 67/141; H04L 67/142; H04L 67/20;

(Continued)

(56) References Cited

U.S. PATENT DOCUMENTS 6,647,467 B1 * 11/2003 Dowling ............... G06F 9/3806
711/125
7,664,928 B1 * 2/2010 Andrews ............. G06F 9/30043
712/29

(Continued)

FOREIGN PATENT DOCUMENTS

| CN | 102223418 A | 10/2011 |
| CN | 109086407 A | 12/2018 |
| CN | 109918391 A | 6/2019 |

OTHER PUBLICATIONS

U.S. Appl. No. 17/070,662, filed Oct. 14, 2020, naming inventors McConnell et al.

(Continued)

*Primary Examiner* — Greg C Bengzon
(74) *Attorney, Agent, or Firm* — Shumaker & Sieffert, P.A.

(57) ABSTRACT

In general, this disclosure describes techniques for applying a distributed pipeline model in a distributed computing system to cause processing nodes of the distributed computing system to process data according to a distributed pipeline having an execution topology, specified within a pipeline statement, to perform a task.

19 Claims, 8 Drawing Sheets

(58) Field of Classification Search
CPC .......... H04L 67/2814; H04L 67/2842; H04L 67/2852; H04L 67/288; H04L 67/325; H04L 69/03; H04L 69/12; H04L 69/327; H04L 69/329; G06F 9/4843; G06F 9/45558; G06F 9/4881; G06F 9/5027; G06F 9/3851; G06F 9/5066; G06F 9/4856; G06F 9/5038; G06F 3/0484; G06F 9/3009; G06F 9/3885; G06F 9/4411; G06F 9/5072; G06F 9/522; G06F 9/544; G06F 16/24532; G06F 3/067; G06F 9/30123; G06F 9/38; G06F 9/3887; G06F 9/3889; G06F 9/3891; G06F 9/3893; G06F 12/0813; G06F 15/16; G06F 15/163; G06F 15/17312; G06F 8/41; G06F 8/433; G06F 8/458; G06F 9/30; G06F 9/30087; G06F 9/3017; G06F 9/3826; G06F 9/3828; G06F 9/3881; G06F 9/44; G06F 9/466; G06F 9/4806; G06F 9/3005; G06F 9/30079; G06F 9/382; G06F 9/3855; G06F 9/3867; G06F 9/3869; G06F 9/3871; G06F 9/3873; G06F 9/3875; G06F 15/17325; G06F 7/762; G06F 8/42; G06F 8/423; G06F 8/4451; G06F 8/4452; G06F 9/44578; G06F 8/45; G06F 8/54; G06F 30/327; G06F 30/34; G06F 30/343; G06F 8/314; G06F 9/30032; G06F 9/30036; G06F 9/30043; G06F 9/30134; G06F 9/30138; G06F 9/542; G06F 9/546; G06Q 10/06; G06Q 40/04; G06T 1/20; G06T 1/60

See application file for complete search history.

(56) References Cited

U.S. PATENT DOCUMENTS

| | | | | |
|---|---|---|---|---|
| 8,615,770 B1* | 12/2013 | Stratton | G06F 9/4843 | 718/107 |
| 10,043,232 B1* | 8/2018 | Ramadoss | G06F 9/3887 | |
| 10,146,845 B2* | 12/2018 | Henrichs | G06F 16/258 | |
| 11,238,048 B1* | 2/2022 | Breeden | G06F 16/2465 | |
| 2001/0047434 A1* | 11/2001 | Liu | G06F 9/3867 | 709/253 |
| 2002/0198888 A1* | 12/2002 | Young | G06F 9/4881 | |
| 2004/0078554 A1* | 4/2004 | Glossner, III | G06F 9/3455 | 712/220 |
| 2005/0289299 A1* | 12/2005 | Nunamaker | G06F 9/30036 | 711/122 |
| 2008/0016290 A1* | 1/2008 | Pennock | G06F 9/3812 | 711/154 |
| 2008/0016321 A1* | 1/2008 | Pennock | G06F 9/3867 | 712/35 |
| 2008/0177993 A1* | 7/2008 | Bendert | G06F 9/544 | 712/245 |
| 2008/0320284 A1* | 12/2008 | Grzywna | G06T 1/20 | 712/220 |
| 2009/0031104 A1* | 1/2009 | Vorbach | G06F 9/3885 | 712/18 |
| 2010/0333099 A1* | 12/2010 | Kupferschmidt | G06F 9/546 | 718/103 |
| 2011/0276789 A1* | 11/2011 | Chambers | G06F 9/45504 | 712/220 |
| 2012/0017066 A1* | 1/2012 | Vorbach | G06F 9/3885 | 712/11 |
| 2012/0047350 A1* | 2/2012 | Lancaster | G06F 15/8015 | 712/30 |
| 2013/0044641 A1* | 2/2013 | Koponen | H04L 45/04 | 370/255 |
| 2013/0058335 A1* | 3/2013 | Koponen | H04L 45/00 | 370/390 |
| 2013/0069960 A1* | 3/2013 | McCombe | G06T 15/06 | 345/505 |
| 2013/0070588 A1* | 3/2013 | Steele | H04L 49/90 | 370/230 |
| 2013/0091507 A1* | 4/2013 | Wu | G06F 9/5038 | 718/104 |
| 2015/0016266 A1* | 1/2015 | Dumitrescu | H04L 47/215 | 370/236 |
| 2015/0106419 A1* | 4/2015 | Davis | H04L 67/10 | 709/201 |
| 2015/0277916 A1* | 10/2015 | Khartikov | G06F 9/3855 | 712/205 |
| 2015/0341422 A1* | 11/2015 | Farnlof | G06F 9/544 | 709/202 |
| 2016/0226759 A1* | 8/2016 | Zhang | H04L 49/9068 | |
| 2016/0299860 A1* | 10/2016 | Harriman | G06F 13/4282 | |
| 2017/0083315 A1* | 3/2017 | Burger | G06F 9/3802 | |
| 2017/0083316 A1* | 3/2017 | Burger | G06F 9/3824 | |
| 2017/0083334 A1* | 3/2017 | Burger | G06F 9/30076 | |
| 2017/0083337 A1* | 3/2017 | Burger | G06F 9/3859 | |
| 2017/0177263 A1* | 6/2017 | Das | G06F 3/0604 | |
| 2017/0178384 A1* | 6/2017 | Venkatesh | G06F 8/41 | |
| 2017/0180266 A1* | 6/2017 | Frank | H04L 67/16 | |
| 2017/0287105 A1* | 10/2017 | Meixner | G06F 9/30036 | |
| 2017/0300361 A1* | 10/2017 | Lanka | G06F 9/4881 | |
| 2017/0364844 A1* | 12/2017 | Saraf | G06Q 10/0633 | |
| 2018/0052861 A1* | 2/2018 | Seetharaman | G06F 3/0649 | |
| 2018/0107525 A1* | 4/2018 | Govindaraju | G06F 8/71 | |
| 2018/0136951 A1* | 5/2018 | Palavalli | G06F 8/60 | |
| 2018/0136970 A1* | 5/2018 | Nandagopal | G06F 9/4843 | |
| 2018/0218037 A1* | 8/2018 | Marquardt | G06F 16/24537 | |
| 2018/0239647 A1* | 8/2018 | Tsai | H04L 41/5051 | |
| 2018/0285116 A1* | 10/2018 | Vembu | G06T 1/20 | |
| 2018/0293102 A1* | 10/2018 | Ray | G06T 1/20 | |
| 2018/0293493 A1* | 10/2018 | Kalamkar | G06T 1/20 | |
| 2018/0293692 A1* | 10/2018 | Koker | G06T 1/20 | |
| 2018/0307980 A1* | 10/2018 | Barik | G06F 9/3895 | |
| 2018/0308203 A1* | 10/2018 | Appu | G06N 3/0454 | |
| 2018/0308206 A1* | 10/2018 | Surti | G06N 3/063 | |
| 2018/0314250 A1* | 11/2018 | Lewis | G06N 3/0454 | |
| 2018/0314521 A1* | 11/2018 | Chen | G06F 9/5066 | |
| 2018/0314931 A1* | 11/2018 | Sarel | G06F 9/30014 | |
| 2018/0314933 A1* | 11/2018 | Bleiweiss | G06N 5/003 | |
| 2018/0315158 A1* | 11/2018 | Nurvitadhi | G06F 9/3017 | |
| 2018/0322387 A1* | 11/2018 | Sridharan | G06N 3/084 | |
| 2018/0322606 A1* | 11/2018 | Das | G06T 1/20 | |
| 2018/0329644 A1* | 11/2018 | Das | G06F 3/067 | |
| 2018/0330276 A1* | 11/2018 | Dai | F02C 7/04 | |
| 2018/0337781 A1* | 11/2018 | Frankel | H04L 67/10 | |
| 2018/0343321 A1* | 11/2018 | Chang | G06F 16/283 | |
| 2019/0026149 A1* | 1/2019 | Jiang | G06F 9/522 | |
| 2019/0042269 A1* | 2/2019 | Pearce | G06F 9/4843 | |
| 2019/0102179 A1* | 4/2019 | Fleming | G06F 9/3017 | |
| 2019/0121679 A1* | 4/2019 | Wilkinson | G06F 9/522 | |
| 2019/0204901 A1* | 7/2019 | Ramadoss | G06F 1/3293 | |
| 2019/0205737 A1* | 7/2019 | Bleiweiss | G06N 20/00 | |
| 2019/0205747 A1* | 7/2019 | Srivastava | G06N 3/0445 | |
| 2019/0235915 A1* | 8/2019 | Hakura | G06F 12/0855 | |
| 2019/0268401 A1 | 8/2019 | Desai et al. | | |
| 2019/0303018 A1* | 10/2019 | Huang | G06F 16/256 | |
| 2019/0303207 A1* | 10/2019 | Vadapandeshwara | G06F 9/5038 | |
| 2019/0304054 A1* | 10/2019 | Appu | G06N 3/084 | |
| 2019/0319851 A1* | 10/2019 | Eckart | H04L 41/142 | |
| 2019/0332438 A1* | 10/2019 | Li | G06F 1/3296 | |
| 2019/0332449 A1* | 10/2019 | Adolfsson | G06F 9/5038 | |
| 2019/0332903 A1* | 10/2019 | Nealis | G06F 5/015 | |
| 2019/0340190 A1* | 11/2019 | Ganteaume | G06F 40/30 | |
| 2019/0340804 A1* | 11/2019 | Kennedy | A63F 13/355 | |
| 2019/0342372 A1* | 11/2019 | Lee | H04L 67/10 | |
| 2020/0013138 A1* | 1/2020 | Vembu | G06F 9/5072 | |
| 2020/0027015 A1* | 1/2020 | Yao | G06F 9/4843 | |
| 2020/0050451 A1* | 2/2020 | Babich | G06F 9/4843 | |
| 2020/0051309 A1* | 2/2020 | Labbe | G06N 3/0454 | |
| 2020/0082015 A1 | 3/2020 | Watts et al. | | |
| 2020/0143246 A1 | 5/2020 | Li et al. | | |
| 2020/0143579 A1* | 5/2020 | Sarel | G06N 3/02 | |
| 2020/0151120 A1* | 5/2020 | Thyamagondlu | G06F 9/544 | |

(56) References Cited

U.S. PATENT DOCUMENTS

| | | | |
|---|---|---|---|
| 2020/0153616 A1* | 5/2020 | Savalle | H04L 9/0819 |
| 2020/0159568 A1* | 5/2020 | Goyal | G06F 9/4843 |
| 2020/0160185 A1* | 5/2020 | Praveen | G06N 3/082 |
| 2020/0174791 A1* | 6/2020 | Zbiciak | G06F 9/30036 |
| 2020/0174840 A1* | 6/2020 | Zhao | G06N 3/084 |
| 2020/0175396 A1* | 6/2020 | Boyce | G06N 5/04 |
| 2020/0177510 A1* | 6/2020 | Ramey | H04L 67/1008 |
| 2020/0193221 A1* | 6/2020 | Aftab | G06N 20/00 |
| 2020/0204618 A1* | 6/2020 | Agarwal | H04L 9/0643 |
| 2020/0210228 A1* | 7/2020 | Wu | G06N 3/0454 |
| 2020/0210301 A1* | 7/2020 | Nandan | G06F 11/2242 |
| 2020/0211147 A1* | 7/2020 | Doyle | G06F 9/3877 |
| 2020/0211231 A1* | 7/2020 | Brownlee | G06T 9/40 |
| 2020/0211263 A1* | 7/2020 | Janus | G06T 1/60 |
| 2020/0225920 A1* | 7/2020 | Pelton | G06F 30/327 |
| 2020/0225932 A1* | 7/2020 | Lakshminarayanan | G06N 20/00 |
| 2020/0293330 A1* | 9/2020 | Mangnall | G06F 1/03 |
| 2020/0293367 A1* | 9/2020 | Andrei | G06F 3/08 |
| 2020/0293368 A1* | 9/2020 | Andrei | G06F 9/3851 |
| 2020/0293369 A1* | 9/2020 | Maiyuran | G06F 9/30109 |
| 2020/0293380 A1* | 9/2020 | Ashbaugh | G06F 9/4881 |
| 2020/0320403 A1* | 10/2020 | Daga | G06N 3/063 |
| 2020/0356403 A1* | 11/2020 | Kasha | G06F 9/46 |
| 2020/0364921 A1* | 11/2020 | Burke | G06F 9/4881 |
| 2020/0380357 A1* | 12/2020 | Yao | G06N 3/0445 |
| 2021/0027416 A1* | 1/2021 | Schluessler | G06T 1/20 |
| 2021/0035258 A1* | 2/2021 | Ray | G06F 17/16 |
| 2021/0051066 A1* | 2/2021 | Desai | H04L 49/90 |
| 2021/0081774 A1* | 3/2021 | Barik | G06N 3/0445 |
| 2021/0097756 A1* | 4/2021 | Surti | G06T 15/80 |
| 2022/0156079 A1* | 5/2022 | Chen | G06F 9/3806 |

OTHER PUBLICATIONS

"Unix philosophy," Wikipedia, the free encyclopedia, last edit made on Feb. 7, 2021, retrieved from https://en.wikipedia.org/wiki/Unix_philosophy, accessed on Mar. 11, 2021, 10 pp.

"Plan 9 from Bell Labs," Wikipedia, the free encyclopedia, last edit made on Mar. 2021, retrieved from https://en.wikipedia.org/wiki/Plan_9_from_Bell_Labs, accessed on Mar. 11, 2021, 10 pp.

International Search Report and Written Opinion of International Application No. PCT/USIB2021/055410, dated Sep. 28, 2021, 7 pp.

International Preliminary Report on Patentability from International Application No. PCT/IB2021/055410 dated Jan. 10, 2023.

\* cited by examiner

DISTRIBUTED PIPELINE CONFIGURATION IN A DISTRIBUTED COMPUTING SYSTEM

This application claims the benefit of U.S. Provisional Application No. 63/049,920, filed Jul. 9, 2020, which is incorporated by reference herein in its entirety.

TECHNICAL FIELD

The disclosure relates to a computing system, and in particular, to distributed processing within a computing system.

BACKGROUND

Nodes executing on computing devices may be interconnected to form a networked distributed computing system to exchange data and share resources. In some examples, a plurality of nodes executing on computing devices are interconnected to collectively execute one or more applications to perform a job. Nodes may include bare metal servers, virtual machines, containers, processes, and/or other execution element having data processing capabilities for the distributed computing system. Each of the nodes may individually perform various operations for the distributed computing system, such as to collect, process, and export data, and the nodes may communicate with one another to distribute processed data.

SUMMARY

In general, this disclosure describes techniques for applying a distributed pipeline model in a distributed computing system to cause processing nodes of the distributed computing system to process data according to a distributed pipeline having an execution topology, specified within a pipeline statement, to perform a task. For example, a computing device may receive a pipeline statement for a task. The pipeline statement includes a plurality of stage statements, each of the stage statements describing a corresponding stage that is to execute a set of one or more operations. One or more of the stage statements also specify topology information for the corresponding stages. For example, a stage statement may specify that the corresponding stage includes a sub-pipeline to be performed by a specified one or more processing nodes of the distributed computing system. The stage statement may specify that the specified one or more processing nodes are to execute one or more operations of the sub-pipeline. In some cases, the stage statement also specifies a next stage that is to receive the output of the corresponding stage for the stage statement. In some cases, the pipeline statement is human-readable text to allow an operator to easily arrange the operations within stages and to arrange the stages within the pipeline statement to specify a distributed pipeline having an overall execution topology for the task being executed by the distributed computing system. The computing device that receives a pipeline statement may be or may execute one of the processing nodes of the distributed computing system. In such cases, this processing node may be referred to as the origin.

The computing device processes the pipeline statement to cause processing nodes of the distributed computing system to process data according to the execution topology specified within the pipeline statement. For example, the computing device may output individual commands, at least some of the pipeline statement, stage information, configuration data, or other control information to the processing nodes to cause the nodes to process data according to the execution topology. Processing nodes thereafter begin executing operators for the operations within a stage and bind the operators together using input/output channels, such as standard streams (stdin, stdout) or queues. Operators may be processes, for instance, and operators bound within a stage may be referred to as a sub-pipeline. If a stage statement specifies a next stage as the final operation for the corresponding stage, one or more processing nodes that perform the corresponding stage may bind the final operation of the stage to one or more processing nodes configured to perform the next stage. Binding operations for multiple stages between processing nodes may include creating a communication channel between the processing nodes that operates over a network, such as a socket. The inter-node bindings from a stage to the next stage may cause the data output by the final operation of the stage to fan-out (i.e., output by one processing node and received by multiple processing nodes) or to fan-in (i.e., output by multiple processing nodes and received by one processing node) to the next stage.

In one example, a pipeline statement may include a first stage specifying one or more operations to be processed by each of a plurality of processing nodes and a second stage specifying one or more operations to be processed by a fan-in node of the processing nodes, such as the origin. The plurality of processing nodes may generate a first sub-pipeline for the first stage that binds operators of the first stage to process the data to perform the corresponding operations and then send the results of the operators to the second stage. As one example, each of the processing nodes may orchestrate queues and interfaces for its local operators and generate a send operation to send the results of its local operators to the fan-in node. The fan-in node may generate a second sub-pipeline for the second stage that binds operators of the second stage and receives the results of the operations of the first stage output by the plurality of processing nodes. As one example, the fan-in node may orchestrate queues and interfaces for its local operators to first receive the results of the operations of the first stage and also to execute its local operators to perform the operations of the second stage.

The techniques described herein may provide one or more technical advantages that provide at least one practical application. For example, the techniques may extend the conventional single-device Unix-style pipeline model to realize a distributed pipeline model in which processing nodes of a distributed computing system set up sub-pipelines, at least partially independently, for an overall distributed pipeline and process data according to an execution topology, specified within a pipeline statement, to perform a task. By automatically generating a distributed pipeline to bind operations to be processed according to a topology, the techniques may allow a user to specify, in the form of a comparatively simple pipeline statement, all operations and a topology for a distributed pipeline, thereby avoiding the often complex and cumbersome task of configuring each of the nodes of the distributed computing system with not only the operations to be performed, but also the inter-node communication channels for the topology among the nodes. The specified topology may exploit parallelism both within and among processing nodes of the distributed computing system to at least partially concurrently execute operations of a sub-pipeline defined for a stage in the pipeline statement.

In some examples, a distributed computing system comprises a plurality of computing devices configured to obtain a pipeline statement, the pipeline statement comprising a first stage statement defining a first stage to include a first sub-pipeline and specifying a second stage as a recipient for result data of the first sub-pipeline, the pipeline statement also comprising a second stage statement defining the second stage to include a second sub-pipeline, wherein the plurality of computing devices comprises a first processing node configured to, based at least on a first pipeline setup specification generated by processing the pipeline statement, configure the first sub-pipeline in the first processing node to send result data of the first sub-pipeline in the first processing node to a second processing node, and wherein the plurality of computing devices comprises the second processing node configured to, based at least on a second pipeline setup specification generated by processing the pipeline statement, configure the second sub-pipeline in the second processing node and to input, to the second sub-pipeline in the second processing node, the result data of the first sub-pipeline in the first processing node.

In some examples, a distributed computing system comprises a plurality of devices configured to execute respective collaborative programs to: receive a pipeline statement, wherein the pipeline statement comprises a plurality of stages, wherein each of the stages comprises one or more operations to be processed by one or more of the plurality of devices, and wherein the one or more operations of the stages are to be processed in different topologies, and generate a sub-pipeline of a distributed pipeline to bind the one or more operations of the stages and output result data from a final stage of the stages.

In some examples, a method comprises receiving, by a device of a plurality of devices connected by a network, a command comprising a plurality of stages, wherein each of the stages comprises one or more operations to be processed by one or more of the plurality of devices, and wherein the one or more operations of the stages are to be processed in different topologies; distributing, by the device and to other devices of the plurality of devices, the command such that the other devices of the plurality of devices each generate a first sub-pipeline of a distributed pipeline, wherein the first sub-pipeline binds the one or more operations processed in a first topology of the different topologies; and generating, by the device, a second sub-pipeline of the distributed pipeline, wherein the second sub-pipeline binds the one or more operations processed in a second topology of the different topologies.

In some examples, a method comprises obtaining, by a distributed computing system comprising a first processing node and a second processing node, a pipeline statement comprising a first stage statement defining a first stage to include a first sub-pipeline and specifying a second stage as a recipient for result data of the first sub-pipeline, the pipeline statement also comprising a second stage statement defining the second stage to include a second sub-pipeline; configuring, based at least on a first pipeline setup specification generated from the pipeline statement, the first sub-pipeline in the first processing node to send result data of the first sub-pipeline in the first processing node to a second processing node; and configuring, based at least on a second pipeline setup specification generated from the pipeline statement, the second sub-pipeline in the second processing node to input, to the second sub-pipeline in the second processing node, the result data of the first sub-pipeline in the first processing node.

The details of one or more examples are set forth in the accompanying drawings and the description below. Other features, objects, and advantages will be apparent from the description and drawings, and from the claims.

BRIEF DESCRIPTION OF THE DRAWINGS

Like reference characters refer to like elements throughout the figures and text.

DETAILED DESCRIPTION

Figure 1:
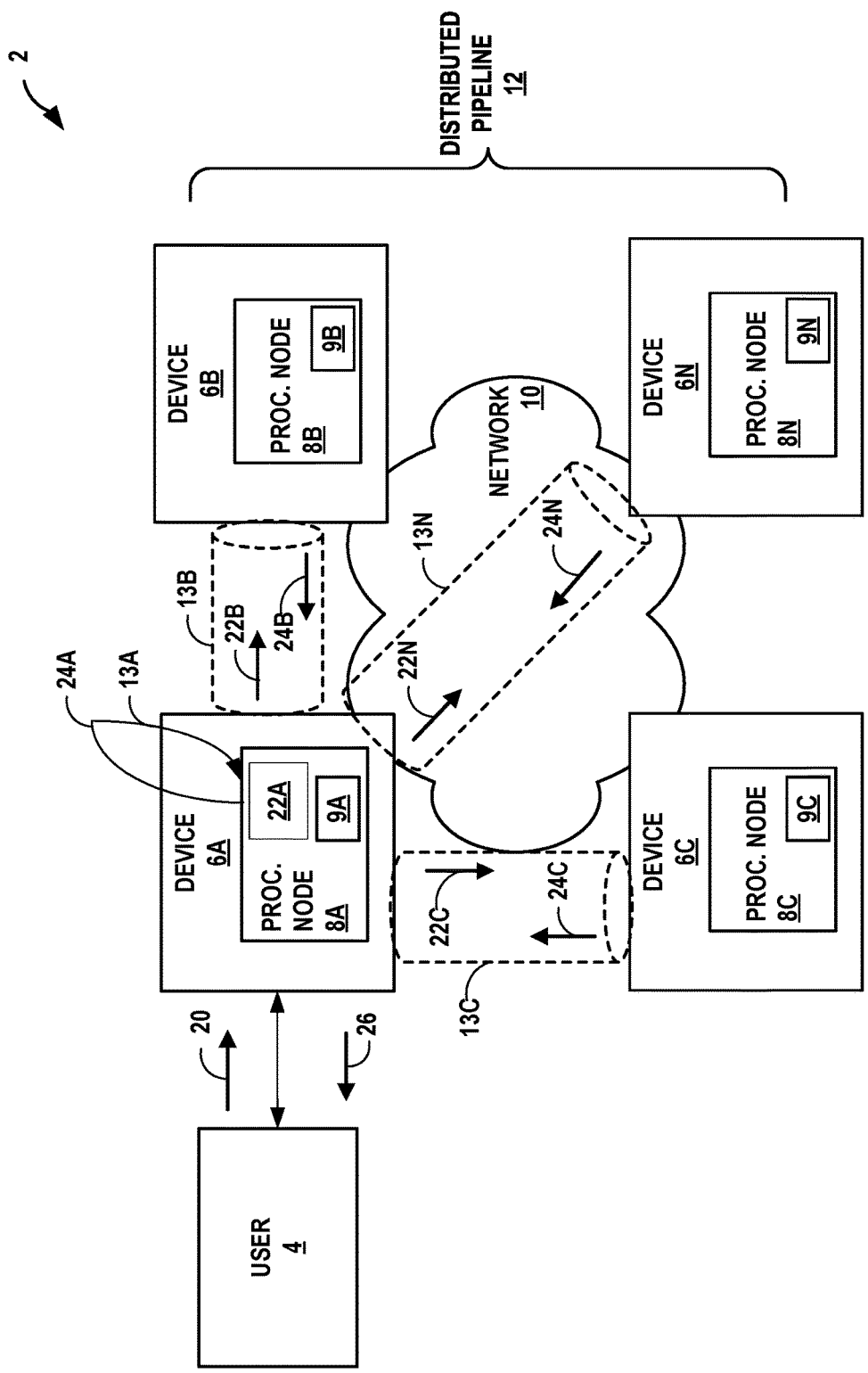
FIG. 1 is a block diagram of an example distributed computing system 2 that includes a plurality of processing nodes configured to execute distributed pipelines that are generated from pipeline statements in accordance with one or more aspects of the techniques disclosed.

FIG. 1 is a block diagram of an example distributed computing system 2 that includes a plurality of processing nodes configured to execute distributed pipelines that are generated from pipeline statements in accordance with one or more aspects of the techniques disclosed. The distributed pipelines include operations bound and processed by the processing nodes according to topologies indicated in the pipeline statements.

In the example of FIG. 1, distributed computing system 2 includes a plurality of computing devices 6A-6N (collectively, "devices 6") that are coupled to and communicate via network 10. Network 10 may be a local area network ("LAN"), wide area network ("WAN"), a metropolitan area network ("MAN"), or other type of network. Devices 6 of network 10 may use one or more packet-based protocols, such as Transmission Control Protocol (TCP)/Internet Protocol (IP), to exchange data.

Each of devices 6 is a real or virtual processing node and executes or represents at least one processing node 8 within the distributed computing system (sometimes referred to more simply as "distributed system"). Each of devices 6 may be, for example, a workstation, laptop computer, tablet, rack-mounted server, other real or virtual server, a container or virtual machine. In some cases, any of devices 6 may represent "Internet-of-Things" (IoT) devices, such as cameras, sensors, televisions, appliances, etc. As one example implementation, devices 6 may represent devices of a smart-city grid, where each device is configured to collect and/or process data. In this example, devices 6B-6N may represent sensor devices (e.g., smart meters) to collect and/or process data, and device 6A may represent a device including sensor devices and a Central Processing Unit ("CPU") to append the data, process the data, and/or export the data. In some examples of distributed computing system 2, devices 6 may be heterogeneous in that devices 6 may represent devices having different hardware and/or software. For instance, device 6A may be a desktop workstation, while device 6B may be a rack-mounted server in a cloud computing center, while device 6C may be a wireless sensor, and so forth.

Hardware environments of devices 6 may also be heterogenous. For example, devices 6 may include any one or more of CPUs with varying numbers of processing cores, ASICs, field-programmable devices, Graphics Processing Units (GPUs), or other processing circuitry.

In this example, devices 6A-6N include processing nodes 8A-8N (collectively, "processing nodes 8"), respectively. Processing nodes 8 execute programs 9A-9N (collectively, "programs 9"), respectively, to process commands. Commands may represent partial execute steps/processing for performing an overall task. Commands are included in pipeline statement 20 and may in some cases be text-based. A task for the distributed computing system 2 may include one or more operations corresponding to commands, such as retrieving data, processing data, exporting data, or the like. A command may refer to a particular one of programs 9 executed by each processing nodes 8. In some examples, each of processing nodes 8 represents an in-memory storage engine that manages data stored in a shared memory segment or partition that can be accessed directly by the storage engine. A single device 6 may in some cases execute multiple instances of processing nodes 8, e.g., as multiple virtual machines. However, in the case of a bare metal server, for instance, one of devices 6 may be one of processing nodes 8 in that the device executes programs 9 directly on hardware.

Programs 9 may include a command-line interface (CLI), graphical user interface (GUI), other interface to receive and process text-based commands, such as a shell. Programs 9 may alternatively or additionally include a suite of different processes, applications, scripts, or other executables that may be combined in a series to perform a larger task. As an example, programs 9A may be arranged, to realize a larger task specified using a pipeline, within device 8A and executed according a single-device Unix-style pipeline model in which programs 9A are chained together by their standard streams in order that the output data of one of programs 9A is directed as input data to the input of another of programs 9A, which processes the input data. The output data of this program is directed as input data to the input of another of programs 9A, and so on until the final one of programs 9A in the pipeline outputs (e.g., to an interface, another program, or to storage) the final output data. Programs 9 may also refer to different routines, functions, modules, or other sets of one or more operations executed by one or more processes. For example, programs 9A may refer to a single shell, executed by processing node 8A, that can receive one or more operators arranged in a pipeline, execute corresponding operations, and arrange the streams of these operations to realize a pipeline.

In accordance with the techniques described herein, processing nodes 8 collaboratively execute programs 9 according to a distributed pipeline generated from a pipeline statement 20. The distributed pipeline includes selected programs from programs 9A-9N arranged in a pipeline topology that may include both intra-processing node branches and inter-processing node branches. In the illustrated example, the pipeline topology includes inter-processing node branches illustrated in FIG. 1 as inter-processing node pipes that binds one or more operations executed on different processing nodes.

In the example of FIG. 1, user 4 may provide a pipeline statement 20 to program 9A running on processing node 8A of device 6A. The device that originally receives the command from user 4 is referred to herein as an "origin device." Pipeline statement 20 may specify a task to be collectively processed by the devices 6, such as to read data, filter, transform, map, analyze or process data, sort data, export data, or other operations.

Pipeline statement 20 specifies a plurality of stage statements, each of the stage statements describing a corresponding stage that is to execute a set of one or more operations. One or more of the stage statements also specifies topology information for the corresponding stages. For example, a stage statement may specify that the corresponding stage includes a specified one or more nodes 8 of the distributed system. The stage statement may specify that the specified one or more nodes 8 are to execute a specified one or more operations. In some cases, the stage statement also specifies a next stage that is to receive the output of the corresponding stage for the stage statement. Pipeline statement 20 may be human-readable text to allow user 4 to easily arrange the operations within stages and to arrange the stages within pipeline statement 20 to specify an overall execution topology for the task being executed by the distributed computing system 2.

The node that receives pipeline statement 20 may be or may execute one of processing nodes 8, as in the example of FIG. 1. In cases in which the node that receives pipeline statement 20 is or executes one of processing nodes 8, this node (processing node 8A in the illustrated example) may be referred to as the origin node or, more simply, the origin. In some cases, a separate device and/or process that is not one of processing nodes 8 may receive and process pipeline statement 20. In such cases, the separate device and/or process may be referred to as the controller, and the controller may designate one of processing nodes 8 as the origin. In general, the origin generates and outputs the final result of processing pipeline statement 20. However, this output may be via a controller. The origin or controller represents a compiler computing device that received the pipeline statement and performs operations described below to compile the pipeline statement to generate and then distribute pipeline setup specifications, the pipeline setup specifications including at least partial topology information to configure a distributed processing topology in and among processing nodes 8 for the overall task represented in pipeline statement 20. However, this compiler computing device and the operations may be performed by multiple different computing devices. Hereinafter, these operations are described with respect to an origin that receives pipeline statement 20 but these operations may be performed, at least in some respects, by a controller that delegates some of the operations to one of processing nodes 8.

Processing node 8A receives pipeline statement 20. In response, processing node 8A processes pipeline statement 20 to determine, based on the syntax of pipeline statement 20, that one or more operations of the pipeline statement 20 are to be processed on different processing nodes 8. For example, the syntax of pipeline statement may include a plurality of stage statements, each specifying one or more operations for a corresponding stage. In the example of FIG. 1, pipeline statement 20 may include one or more operations to be processed by each of processing nodes 8A-8N as part of a first stage (e.g., data collection and processing) and one or more operations to be processed by the origin processing node 8A as part of a second stage (e.g., data aggregation and export).

Pipeline statement 20 may provide, by its structure, syntax, and semantics, topological information describing configuration of a cluster of processing nodes 8 or other distributed grid, partition cardinality, and operator sequencing abstracted into a pattern. The distributed pipeline described by pipeline statement 20 may be non-linear, circular, realize a feedback loop, and/or based on processing node capabilities (e.g., available hardware and/or software resources).

Each stage statement may specify one or more processing nodes 8 to perform the operations specified in the stage statement. Each stage statement may alternatively or additionally specify one or more data structures with respect to which the corresponding stage is to be executed. Such data structures may include database/table partitions, for instance.

For example, a stage statement may indicate that all processing nodes 8 are to perform the operation in the stage statement. The syntax element to indicate all processing nodes 8 may include "all nodes" or "all partitions" as in the stage statement for first stage statement 324 of pipeline statement 302 described below," or other syntax element. By indicating "on all partitions" for a stage, a stage statement implicitly indicates that each of the processing nodes managing any of the "all partitions" should execute the stage with respect to the partitions it is managing. A stage statement may include syntax to explicitly specify the one or more nodes that are to perform the stage with respect to an explicitly specified one or more data structures. For example, stage statement "stage stageC on all partitions on origin-node:" specifies that the origin-node is to execute operators of the stage with respect to all partitions, such as partitions of a database table. The specified set of nodes in the previous statement may be distinct from the statement "stage stageC on all partitions", which does not explicitly specify any one or more nodes and therefore implicitly specified all processing nodes that manage any of the "all partitions".

As another example, a stage statement may indicate a single processing node is to perform the operation in the stage statement. The syntax element to indicate a particular, single processing node 8 may be a reference to or name of a particular processing node 8 or may indicate the origin node, e.g., by designating the origin node using the syntax element "origin" or "origin-node" for instance.

Each stage statement may have a corresponding stage identifier that is usable as a reference to the corresponding stage. The syntax elements for defining a stage may include "stage [stage identifier] on [nodes]", where [stage identifier] can be used elsewhere in pipeline statement 20 as a reference to the stage and [nodes] specifies the one or more processing nodes 8 to perform the operations specified in the stage statement. That is, a first stage statement may refer to a second stage statement (and corresponding stage) included in pipeline statement 20. For example, the first stage statement may include the stage identifier for the second stage statement as an operation within the first stage statement to which result data to be output by the first stage corresponding to the first stage statement should be sent. In other words, the second stage is the recipient of result data generated by the first stage and the result data generated by the first stage is input data to the second stage. In the example pipeline statement 302, for instance, the stage statement for first stage statement 324 refers to 'outputCsv' that is the stage identifier for second stage 326 (stage 'outputCsv' in pipeline statement 302). In effect, second stage 326 is a next operation after first stage statement 324 in the overall distributed pipeline.

Because different stage statements within pipeline statement 20 may specify different numbers of processing nodes, pipeline statement 20 may specify a topology that includes fan-in and/or fan-out processing between different stages by processing nodes 8. For example, a first stage statement for a first stage in pipeline statement 20 may specify "all" processing nodes 8 and refer to a second stage defined by a second stage statement, in pipeline statement 20, that specifies a single processing node 8. This pipeline statement 20 specifies a topology that includes fan-in processing from the first stage to the second stage. As another example, a first stage statement for a first stage in pipeline statement 20 may specify a single processing node 8 and refer to a second stage defined by a second stage statement, in pipeline statement 20, that specifies two or more processing nodes 8. This pipeline statement 20 specifies a topology that includes fan-out processing from the first stage to the second stage. Other example topologies, such as one-to-one or many-to-many from stage to stage are also possible when defined in this way in pipeline statement 20. A fan-in topology may be useful where many of devices 6 are responsible for respective sets of data being processing, such as IoT devices responsible for sensor data, distributed database servers or storage engines responsible for database partitions, and so forth. Specifying a fan-in topology using pipeline statement 20 generates a topology that collects data from these many devices for processing at a reduced number of devices. In some cases, the collected data has already been partially processed with an earlier stage specified in pipeline statement 20.

Pipeline statement 20 may also include a syntax element indicating pipeline statement 20 is a pipeline statement, such "pipeline" or "pipeline statement". Pipeline statement 20 may also include a syntax element or otherwise be associated with an identifier for pipeline statement 20, such as a name for pipeline statement 20. Pipeline statement 20 may include syntax elements to indicate a beginning and end of pipeline statement 20, such as "begin" and "end", other text elements, braces, brackets, parentheses, comments, etc. Pipeline statement 20 may be entered into a CLI, stored to a file, executed by a script that references pipeline statement 20, and/or input by other means to distributed system 2. Pipeline statement may be user input. Pipeline statement 20 may include syntax elements to enable parameterizing pipeline statement 20. For example, syntax elements "parameters $table $file" in pipeline statement may enable a user to invoke stored pipeline statement 20 using a CLI or other interface and pass in values for the $table and $file parameters. In such cases, the interface may replace the parameters with the values in each location in a pipeline statement template that includes these parameters and pass the pipeline statement with the replaced values as pipeline statement 20 to a processing node for processing. Alternative schemes for passing values for pipeline statement template parameters to a processing node are contemplated, e.g., using an argument vector or environment variables.

In some examples, a formal grammar for the syntax of a pipeline statement may be as follows:

```
pipelineStatement :=
    PIPELINE <pipelineName>
        BEGIN
            stageDefinition ...
        END ';'
stageDefinition :=
    STAGE <stageName> ON topology ':'
        <operator> [ <arg> ... ] [ '|' <operator> [ <arg> ... ] ] ...
        [ <stageName> ]
topology :=
    ALL NODES
    | ALL PARTITIONS
    | ALL PARTITIONS ON ORIGIN
    | ORIGIN
```

| SPECIFIC NODE node
| SPECIFIC PARTITION partition
| NODE WITH device

The pipeline statement specifies a PIPELINE with a name <pipelineName>. The pipeline statement includes begin and end operators (BEGIN and END in this example). The definition of the stages (stageDefinition) includes one or more stage statements that may conform to stageDefinition in the above grammar. Other grammars are contemplated. As with other example grammars for specifying a pipeline topology described herein, the pipeline statement in the above grammar includes specifies one or more stages and, for each stage, the topology for the stage (including a next stage in some cases) and the ordered list of operators of the sub-pipeline for the stage.

Example topologies for stages are indicated in the above grammar. These include: ALL NODES (execute the sub-pipeline for the stage on all processing nodes); ALL PARTITIONS (execute the sub-pipeline for the stage with respect to all partitions of the data set); ALL PARTITIONS ON ORIGIN (execute the sub-pipeline for the stage with respect to the all of the partitions associated with the origin processing node); ORIGIN (execute the sub-pipeline for the stage on the origin processing node); SPECIFIC NODE node (execute the sub-pipeline for the stage on the identified node); SPECIFIC PARTITION partition (execute the sub-pipeline for the stage with respect to the identified partition partition); and NODE WITH device (execute the sub-pipeline for the stage with respect to the node with the identified device device).

An example statement with the above grammar is as follows and is explained in further detail elsewhere in this description:

```
pipeline export
begin
    stage scanBuffers on all partitions:
        scanOp LineItem | outputCsv
    stage outputCsv on origin:
        toCsvOp | writeFileOp "/tmp/LineItem.csv"
end ;
```

As noted above, other grammars are possible. For example, a shorthand form for a grammar could observe and uphold the original elegance of the Unix pipe/filter syntax and extend that syntax into an arbitrary directed graph of distributed parallelized sub-pipelines. For instance, a shorthand form of the previously-described grammar could be:

```
pipelineStatementShort :=
    <operator> [ <arg> ... ] [ pipe <operator> [ <arg> ... ] ] ...
pipe :=
    '|' - pipe to next operator in sub-pipeline
    | '|*' - short for fan-out across all partitions
    | '*|' - short for fan-in from all partitions to origin
    | '|+' - short for fan-out across all nodes
    | '+|' - short for fan-in from all nodes to origin
    | '|~' - short for all partitions on origin
    | '|?' - short for node with named device
```

An example statement with the above grammar is as follows and is a shorthand restatement of the prior example that conformed to the earlier grammar:

scanOp LineItem|toCsvOp*|writeFileOp "/tmp/LineItem.csv"

In this example, programs 9 that compiles the above shorthand pipeline statement detects the semantics such that is understood to be executed with respect to all partitions (*|) and to fan-in to origin, similar to the two stage statements of pipeline export. This shorthand grammar also includes syntax to specify one or more stages and, for each stage, the topology for the stage (including a next stage in some cases) and the ordered list of operators of the sub-pipeline for the stage.

Processing node 8A may communicate with other processing nodes 8B-8N to set up a distributed pipeline 12 to realize pipeline statement 20. Processing nodes 8 may collaborate to generate distributed pipeline 12. To generate distributed pipeline 12, processing nodes 8 bind operations not only among programs 9 but also between stages and across processing nodes 8.

To set up distributed pipeline 20, processing node 8A communicates pipeline setup specifications 22B-22N (collectively, "pipeline setup specifications 22" including pipeline setup specification 22A for processing node 8A) to respective processing nodes 8A-8N. In some cases, each of pipeline setup specifications 22 may be a duplicate of pipeline statement 20 or a partial duplicate of text in pipeline statement 20 that is relevant to the corresponding processing node 8. In some cases, each of pipeline setup specifications 22 may include configuration commands generated by processing node 8A. The configuration commands may include, for instance, a sub-pipeline provided as a list of operations to be performed by the one of processing nodes 8 that receives any of the pipeline setup specifications 22 and a list of one or more destination processing nodes for output generated by performing the sub-pipeline. Each of pipeline setup specifications 22 may include locations of data to be processed. As already noted, pipeline setup specification 22A may be processed by processing node 8A to configure, on processing node 8A, one or more sub-pipelines for execution by processing node 8A and at least a partial topology involving processing node 8A for distributed pipeline 12. In this way, processing nodes 8 may exchange information regarding the overall task to perform, the location of data to be processed by operations for completing that task, and an interconnection topology among processing node 8 of distributed system 2.

Each of processing nodes 8 that obtains any of pipeline setup specifications 22 by receiving and/or generating any of pipeline setup specifications 22 may process the corresponding pipeline setup specification to configure aspects of distributed pipeline 12. In the example of FIG. 1, processing node 8A may generate a sub-pipeline of distributed pipeline 12 to bind operations to performed by processing node 8A and defined by a stage statement in pipeline statement 20. Similarly, processing node 8B may generate a sub-pipeline of distributed pipeline 12 to bind operations to be performed by processing node 8B and defined by the same stage statement in pipeline statement 20. Similarly, processing node 8C may generate a sub-pipeline of distributed pipeline 12 to bind operations performed by processing node 8C and defined by the same stage statement in pipeline statement 20, and so forth. As further described below, each of processing nodes 8 may orchestrate queues to store inputs and outputs of the operations and generate interfaces between the queues and the operations. A processing node 8 may configure and execute multiple sub-pipelines defined by multiple different stage statements in pipeline statement 20.

As used herein, the term "sub-pipeline" refers to a set of one or more operations bound in a pipeline and performed by any one of processing nodes 8 to execute the operations of a single stage. A sub-pipeline is a sub-pipeline of an overall distributed pipeline defined by pipeline statement 20. A sub-pipeline of a stage defined by a stage statement of pipeline statement 20 may receive input data from a previous sub-pipeline of a stage defined by a previous stage statement in pipeline statement 20, or from an input interface or device such as a storage device. A sub-pipeline of a stage defined by a stage statement of pipeline statement 20 may send output data to a subsequent sub-pipeline of another stage defined by a subsequent stage statement in pipeline statement 20, or to an output interface or device such as a CLI or a storage device. While a stage refers to the collective set of sub-pipelines performed by all processing nodes 8 specified in the corresponding stage statement, a sub-pipeline is a set of operations performed by a single processing node 8. In some cases, any single processing node 8 may execute parallel sub-pipelines with respect to multiple data partitions or streams for which the single processing node 8 is responsible.

As part of processing any of pipeline setup specifications 22 and configuring distributed pipeline 12, processing nodes 8 also bind stages to one another with communication channels. A communication channel may include, for instance, a network socket, a messaging system or bus, a remote procedure call, an HTTP channel, or other communication channel for communicating data from one of devices 6 to another of devices 6. A communication channel may also include intra-device communication "channels," such as an operating system pipe or other message bus, a function call, inter-process communication, and so forth. Each of devices 6 may be configured with network information (e.g., IP address or network name) for devices 6. To set up a communication channel 13 with another device 6, a device 6 may create a socket to the other device 6 using the network information. Communication channel 13 setup may, however, take a variety of forms commensurate with the type of communication channel being setup. Communication channels 13 may be of different types between different pairs of devices 6, particularly in a heterogenous distributed system 2.

FIG. 1 includes communication channels 13A-13N between stages, including intra-device communication channel 13A between a first stage having a first sub-pipeline and a second stage having a second sub-pipeline, both executed by processing node 8A, and inter-device communication channels 13B-13N between the first stage having the first sub-pipelines executed by respective processing nodes 8B-8N and the second stage having the second sub-pipeline executed by processing node 8A.

Any of processing nodes 8 may configure a send operation to send results of its local operations for a sub-pipeline (e.g., for a first stage) to another one or more processing nodes 8 (including in some cases, the sending processing node) to be processed by subsequent one or more sub-pipelines (e.g., for a second stage). In the example of FIG. 1, origin processing node 8A configures a send operation to send the result 24A of executing a sub-pipeline for a first stage to origin processing node 8A as input to a sub-pipeline of a second stage, processing node 8C configures a send operation to send the result 24B of executing the sub-pipeline for the first stage to origin processing node 8A as input to the sub-pipeline of the second stage, processing node 8C configures a send operation to send the result 24C of executing the sub-pipeline for the first stage to origin processing node 8A as input to the sub-pipeline of the second stage, and so on to processing node 8N. The send operation may represent a TCP/IP socket operation (e.g., send( ) to send data over network 10.

Any of processing nodes 8 may configure a receive operation to receive results of a sub-pipeline (e.g., for a first stage), executed by other processing node 8 or by itself, to be processed by a subsequent sub-pipeline (e.g., for a second stage) of the processing node. In the example of FIG. 1, processing node 8A may configure a sub-pipeline of distributed pipeline 12 for operations of a second stage. Processing node 8A may, for instance, orchestrate queues to store inputs and outputs of the operations and configure interfaces between the queues and the operations. Processing node 8A may also configure a receive operation to receive results of operations of the first stage from each of processing nodes 8, such as results 24A-24N (collectively, "results 24"). This receive operation may be executed by processing node 8A for each of communication channels 13 to obtain data sent via the communication channel. The receive operation may represent a TCP/IP socket operation (e.g., recv( ) to receive data sent over network 10. Processing nodes 8 direct data obtained by a receive operation to the next sub-pipeline for processing.

Processing nodes 8 that share a communication channel for inter-stage communications may coordinate, during communication channel setup, to ensure that the input to a communication channel is directed by the receiving processing node 8 to the correct sub-pipeline for execution for the subsequent stage. The communication channel may be associated with an identifier, such as a port, to associate the communication channel with a sub-pipeline. Alternatively, data sent via the communication channel may be tagged or otherwise associated with an identifier to associate the data with a sub-pipeline or with overall distributed pipeline 12. In this latter techniques, different inter-stage bindings may use the same socket, for instance.

When processing node 8A receives results 24 from devices 6B-6N, processing node 8A may aggregate results 24, including the result 24A of operations of the first stage that was locally processed by processing node 8A. In some examples, processing node 8A further processes the aggregated results according to a sub-pipeline for a subsequent stage to generate final results 26. Processing node 8A may export the final results 26 to user 4, such as by displaying final results 26 to a display terminal or writing the aggregated results to a storage device. Alternatively, or additionally, processing node 8A may generate a send operation to send the results to any location, such as to a dynamic query system as described in U.S. Provisional Patent Application No. 62/928,108, entitled "Dynamic Query Optimization," filed Oct. 30, 2019, the entire contents of which is incorporated by reference herein.

By processing pipeline statement 20 to configure and execute a distributed pipeline 12 in this way, the techniques of this disclosure may extend the conventional single-device Unix-style pipeline model to realize a distributed pipeline model in which processing nodes 8 of distributed system 2 set up sub-pipelines, at least partially independently, for overall distributed pipeline 12 and process data according to an execution topology, specified within pipeline statement 20, to perform a task. By automatically generating a distributed pipeline 12 to bind operations to be processed according to a topology, the techniques may allow user 4 to specify, in the form of a comparatively simple pipeline statement 20, all operations and a topology for a distributed pipeline, thereby avoiding the often complex and cumbersome task of configuring each of the processing nodes 8 of distributed system 2 with not only the operations to be performed, but also the inter-node communication channels 13 for the topology among the processing nodes 8.

Figure 2A:
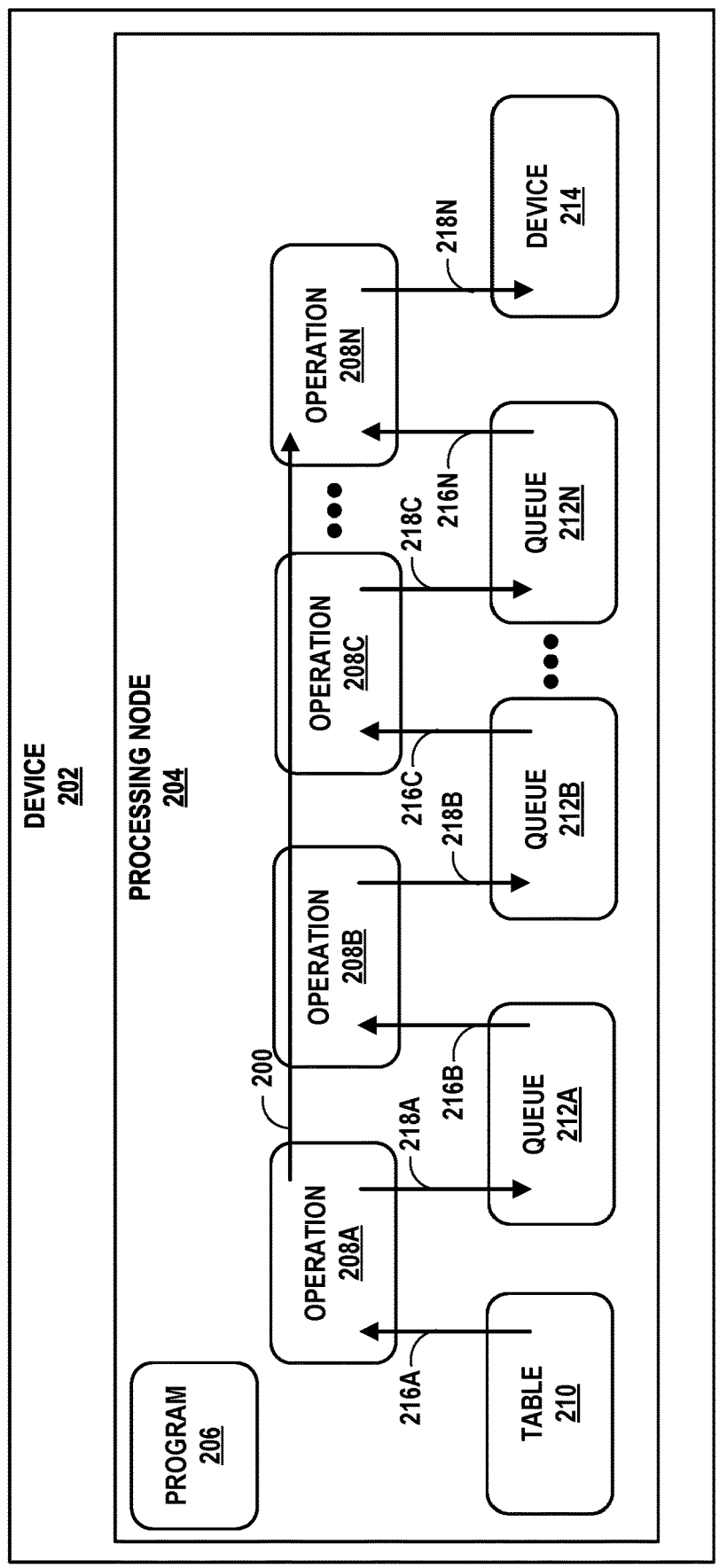
FIGS. 2A-2B are block diagrams of an example sub-pipeline of a distributed pipeline, in accordance with one or more aspects of the techniques in this disclosure.

FIG. 2A is a block diagram illustrating an example sub-pipeline of a distributed pipeline, in accordance with the techniques described in this disclosure. Device 202 of FIG. 2A may represent an example of any of devices 6 of FIG. 1. In the example of FIG. 2A, device 202 includes processing node 204 running at least one program 206 to receive and process commands from a user and/or another device.

In some cases, processing node 204 comprises a storage engine that primarily performs database-related operations, and program 206 may represent a storage engine shell or other shell program. The storage engine shell may offer a high-level programming language that provides a Unix-based shell that can access services of an operating system of device 202. Any of program 206 may also include one or more storage engine utilities.

Program 206 may receive a pipeline statement or a pipeline setup specification, compile it, configure sub-pipelines and communication channels, distribute requests, and move large amounts of data on a grid to process data. Program 206 may obtain, process, and output data in one or more different formats, such as comma-separated value, binary, eXtensible Markup Language (XML), and so forth.

In accordance with techniques of this disclosure, program 206 may provide an elegant and expressive replacement for existing job specification languages or task definitions that require specific instructions from a user to machines to set up a distributed pipeline. Processing node 204 may represent any of processing nodes 8 of FIG. 1, and program 206 may represent any of programs 9 of FIG. 1.

In some examples, to compile a pipeline statement to generate pipeline setup specifications usable by processing nodes to configure states, program 206 may use a descriptor. A descriptor is a nested data structure (e.g., in JavaScript Object Notation or XML format) that includes information for mapping syntax of a pipeline statement to specific objects within the distributed computing system. A processing node 204 may receive a pipeline statement and compile it using the descriptor to generate stages, more specifically, to generate pipeline setup specifications with which processing nodes configure sub-pipelines to implement corresponding stages. The descriptor may specify: (1) the distributed system or grid as a set of named (2) processing nodes specified by a name and/or network address or other reachability information for inter-node communication. Each processing node includes (3) a set of one or more units, where a unit is either a partition of a data structure/data sub-set and the set of available operators for the unit; or a specific capability (e.g. a GPU device) and the set of available operators for the unit. Program 206 may compile the pipeline statement to generate and distribute pipeline setup specification to cause certain pipeline operators to execute by processing nodes that have specialized capabilities, such as GPUs, multi-core processors, ASIC or other discrete logic co-processor, particular programs, or other hardware or software resources.

If a stage statement within a pipeline statement indicates that a sub-pipeline is to execute on a particular one or more nodes, e.g., SPECIFIC NODE 'node', then program 206 may use the descriptor to map 'node' to one of the nodes specified in the descriptor. If a sub-pipeline is to execute with respect to ALL PARTITIONS, then program 206 may use the descriptor to map all units that specify a partition to the nodes that includes a partition and distribute the pipeline setup specification to such nodes. If a stage statement specifies a particular operator, then program 206 may use the descriptor to map the operator to the set of operators for the various units and thence to the nodes that include a unit that has an available operator for the unit.

By using a distributed pipeline model in a potentially heterogenous grid, with free form structure, processing node 204 may receive a pipeline statement, compile it, and cooperate with the operating system of device 202 to configure aspects of a corresponding distributed pipeline on device 202. For example, program 206 may compile a pipeline statement and automatically instantiate and configure sub-pipelines and configuration channels for the distributed pipeline by requesting operations, queues, and sockets, e.g., from the operating system. In other words, program 206 orchestrates the operating system of behalf of the user to accomplish user intents expressed in the pipeline statement. The program 206 may thereby in effect becomes a high-level programming language to a user to, for instance, move and process large amounts of data with a potentially heterogenous set of computing devices. This may be particularly advantageous when the devices are heterogenous because of the difficulty of otherwise manually configuring devices with different operating systems, different configuration and communication mechanisms, and otherwise different ways of being administered.

In some cases, processing node 204 operating as a storage engine provides services to a database platform. Processing node 204 may, for instance, create tables; insert rows; read rows; sort rows; aggregate rows; obtain data from external sources such as pipes, files, streams, and so forth; compress files; perform some calculations; or other processing function that may be associated with storage and database platforms. Example database platform include Hadoop, Greenplum, MySQL or any database providing support for external services.

Processing node 204 may perform common database operations, e.g., joins, group by, aggregation, sorting, order by, filter expressions, and other data operations, processing, and/or analysis. Processing node 204 may invoke cloud services, perform artificial intelligence or machine learning operations, custom algorithms or plugin, standard Unix utilities such as GREP or AWK—with arguments for an operation supplied by program 206, having compiled the pipeline statement, to the operator where each operator is dynamically programmable. In some cases, when a sub-pipeline is executed, program 206 dynamically instantiates operators from a local or remote library. In this way, program 206 is not a fixed program on the device 202 but extends capabilities of device 202 to offer dynamic programming with a relatively simple pipeline statement.

In the example of FIG. 2A, a user or another device may provide a pipeline statement to program 206 running on processing node 204. The pipeline statement may specify one or more operations to be performed by device 202 in one or more stage statements, such as to read data, analyze data, export data, or other operations. In this example, the pipeline statement may include a stage statement that specifies operations 208A-208N (collectively, "operations 208") for device 202 to process data from table 210 and to export the result of the operations to device 214. As one particular example, operation 208A may represent a scan operation that reads data (e.g., rows) from table 210, operation 208B may represent a search operation (e.g., grep) to search for specific text from the rows returned from the scan operation, operation 208C may represent a sort operation to sort the results of the search operation, and operation 208N may represent a send operation to send the result of the operations to device 214. Each of operations 208 may represent an operations performed by a program, application, or any functional operator that can process data. "Operation" and "operator" may be used interchangeably herein in some cases. The operations described in FIG. 2A are merely examples and may represent other types of operation.

Program 206 of processing node 204 may receive a pipeline statement or a pipeline setup specification and process it to generate sub-pipeline 200 to bind operations 208. For example, program 206 orchestrates interfaces between operations 208. For example, program 206 may configure queues 212A-212N (collectively, "queues 212") for passing output data from an operation as input data to a subsequent operation in sub-pipeline 200. In some examples, queues 212 may enqueue pointers to memory buffers (e.g., the memory location that stores data output by an operation for input to another operation). Queues 212 may be described herein and considered as the queue for the next operator that performs the next operation 208. In some cases, program 206 may configure input interfaces 216A-216N (collectively, "input interfaces 216") for some of the operations 208 to obtain data and output interfaces 218A-218N (collectively, "output interfaces 218") for some of the operations 208 to output results of operations 208. Interfaces 216 and 218 may represent Application Programming Interfaces (APIs) or other interfaces. Interfaces may represent or include read/write commands, queuing or IPC operations, or other operations. In some cases, message and data passing between operators for operations may be via another form of inter-process communication, such as via OS pipes.

As one example, scan operation 208A uses input interface 216A to read or obtain the data from table 210. Scan operation 208A uses output interface 218A to output the results (or a pointer to a memory location storing the results) of scan operation 208A to queue 212A. Search operation 208B uses input interface 216B to obtain data from queue 212A such as to obtain the results of operation 208A stored in queue 212A. In some examples, search operation 208B may use input interface 216B to obtain a pointer stored in queue 212A that resolves to a memory location storing the results of operation 208A. The search operation 208B searches the data and stores the results (or a pointer to a memory location storing the results) of search operation 208B in queue 212B via output interface 218B. Sort operation 208C uses input interface 216C to obtain the results of search operation 208B stored in queue 212B. The sort operation 208C sorts the data obtained from queue 212B and stores the results (or a pointer to a memory location storing the results) of sort operation 208C in queue 212N via output interface 218C. Export operation 208N uses input interface 216N to obtain the results of sort operation 208C stored in queue 212N. The send operation 208N then uses output interface 218N to send the data resulting from the sort operation 208C to device 214, which may be a storage device, network interface, or user interface for instance. In this way, the queues and interfaces enable results of an operation to be bound into a sub-pipeline. Device 214 may in some cases be an example of a communication channel 13 for outputting result data from sub-pipeline 200 to another processing node. In this way, program 206 may configure sub-pipeline 200 as part of an distributed pipeline that is distributed among multiple nodes, with multiple stages bound together in a topology.

Figure 2B:
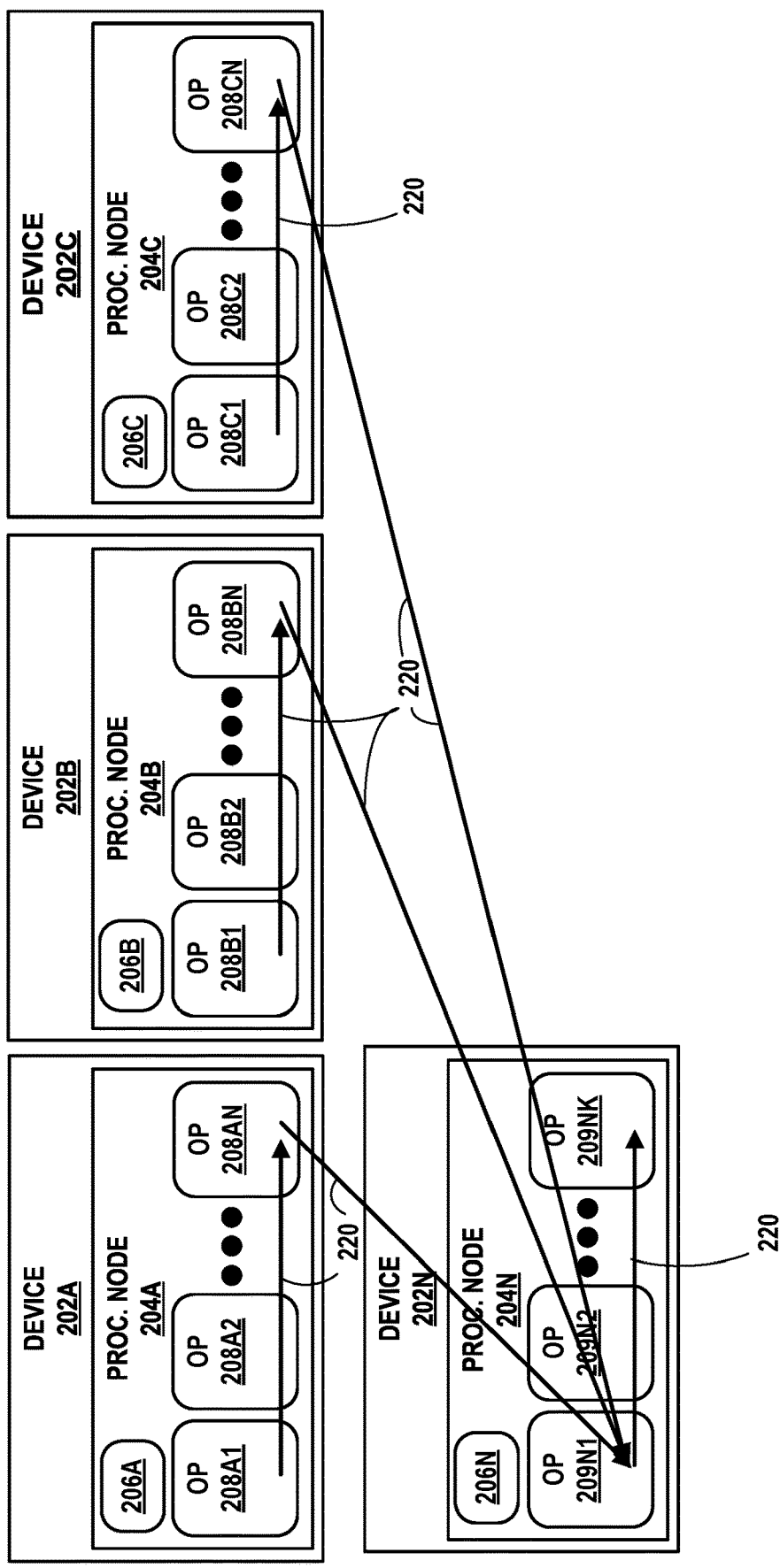

FIG. 2B is a block diagram illustrating a distributed pipeline for a plurality of devices, in accordance with the techniques described in this disclosure. In some examples, a table (e.g., table 210 of FIG. 2A) logically spans a plurality of devices and data partitions. That is, one partition of table 210 may be stored to a device managed by device 202A, another partition of table 210 may be stored to a device managed by device 202B, and so on.

Devices 202 include processing nodes 204A-204N (collectively, "processing nodes 204"), respectively, each running at least one program 206 that may collaborate to generate a distributed pipeline 220 to bind the operations processed by each of devices 202 in accordance with a topology defined by a pipeline statement. A processing node 204 may manage one or more partitions.

In the example of FIG. 2B, program 206N of processing node 204N may receive a pipeline statement specifying that processing node 204N is to perform one or more operations (e.g., retrieve data, analyze data, export data, etc.) in a sub-pipeline. In this example, processing node 204N is the origin, but the original may be any of processing nodes 204 that originally receives a pipeline statement from a user or agent.

The pipeline statement may include a first stage statement that specifies one or more operations to be processed by each of devices 202A-202N as part of a first stage, and a second stage statement that specifies one or more operations processed by device 202N as part of a second stage. The first stage statement may also reference the second stage statement as a destination for results of the first stage. In this example, the first stage may include a scan operation to read from the distributed table and a search operation to search for specific text from the rows returned from the table, and the second stage of the command may include a convert to comma separated values (CSV) operation and an export operation (e.g., to export data to a CSV file).

Program 206N of processing node 204N may process the pipeline statement and determine, from the syntax of the stage statements therein, that the pipeline statement includes operations to be processed in different stages according to a distributed pipeline 220. In response, device 202N generates and distributes pipeline setup specifications to each of devices 202A-202C, respectively, such that each device may configure aspects of distributed pipeline 220.

In this case, to configure aspects of distributed pipeline 220, each of programs 206A-206N may configure in the corresponding processing node 204 a first sub-pipeline of the distributed pipeline 220 for the first stage. For example, program 206A may orchestrates queues and configure interfaces to bind operations 208A1-208AN. Program 206A may also configure a send operation (e.g., operation 208AN) that, when executed, sends the result of the local operations of the first sub-pipeline of processing node 204A to device 202N. In effect, the final operation of a sub-pipeline may be to output the result of the sub-pipeline via a communication channel as the input to another sub-pipeline or to output the result to a device. The result may be input to a queue or other input interface for the first operator of receiving sub-pipeline.

Programs 206B and 206C similarly configure first sub-pipelines for processing nodes 204B and 204C, respectively. Program 206N may similarly configure a first sub-pipeline for processing node 204N as also shown in FIG. 2B. In some examples, the send operation may be bound to or otherwise use a communication channel to send information over a network to another processing node 204 located on a separate device or to another sub-pipeline within a processing node 204.

Program 206N of device 202N may configure a second sub-pipeline of the distributed pipeline 220. For example, program 206N configures a receive operation (e.g., operation 209N1) to receive the results from devices 202A-202C, and orchestrates queues and generates interfaces to bind operations 209N1-209NK. Processing node 204N executing receive operation 209N1 receives result data for the first stage on multiple communication channels (not shown) with multiple processing nodes 204A-204C (and in some cases with processing node 204N). Receive operation 208N1 may include aggregating the result data for processing on the second sub-pipeline for the second stage. For example, receive operation 208N1 may include performing, by an operator, socket recv( ) calls to obtain buffered socket data and adding the buffered socket data (typically as a pointer) to the queue for the next operator for operation 209N2. In this way, distributed pipeline 220 may bind the operations of the first stage (e.g., operations 208A1-208AN, operations 208B1-208BN, operations 208C1-208CN, and in some cases operations 208N1-208NN (not shown)) to the operations of the second stage (e.g., operations 209N1-209NK).

Figure 3A:
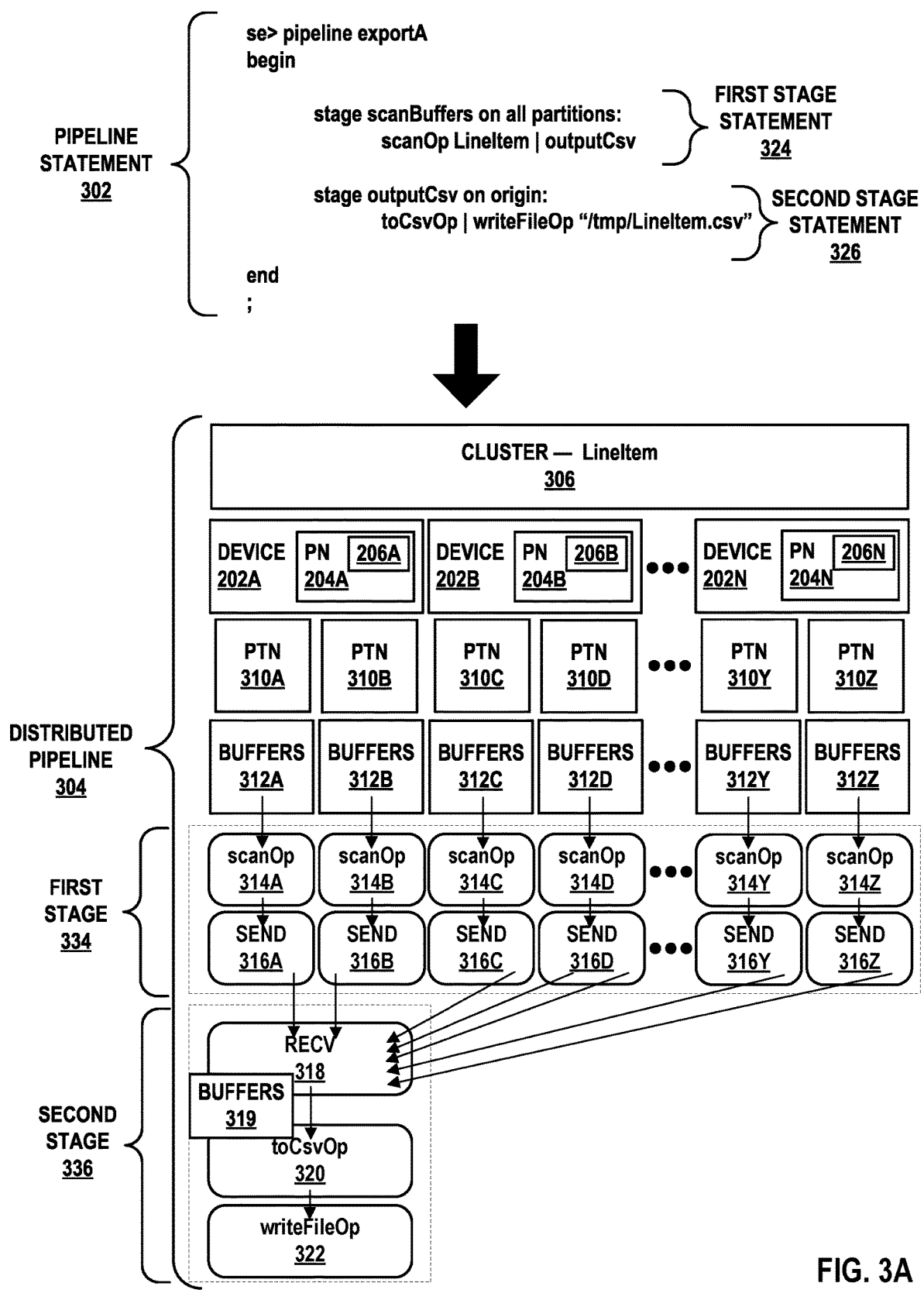
FIGS. 3A-3C are block diagrams illustrating example implementations of a distributed pipeline in greater detail, in accordance with one or more aspects of the techniques disclosed.
Figure 3B:
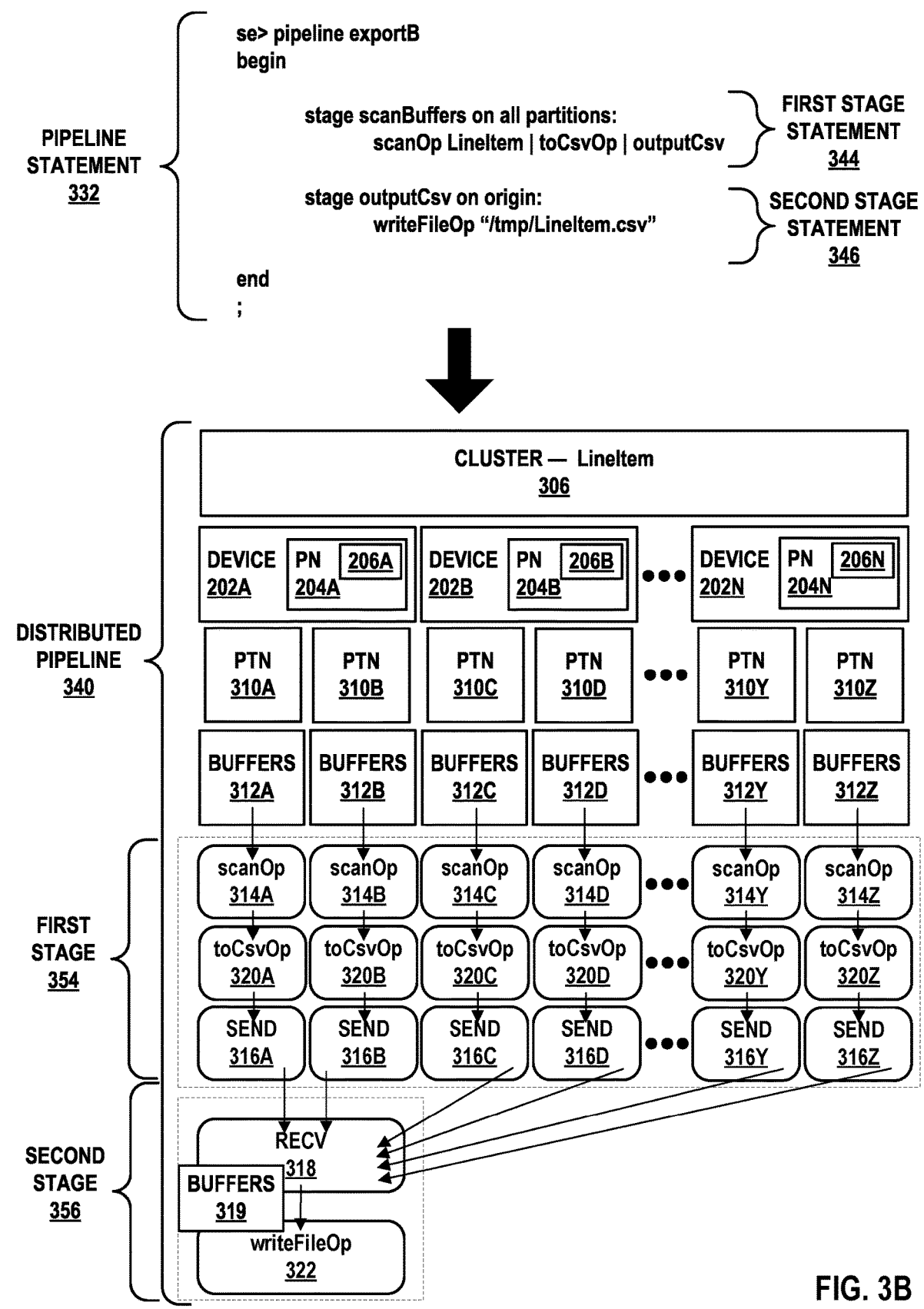
Figure 3C:
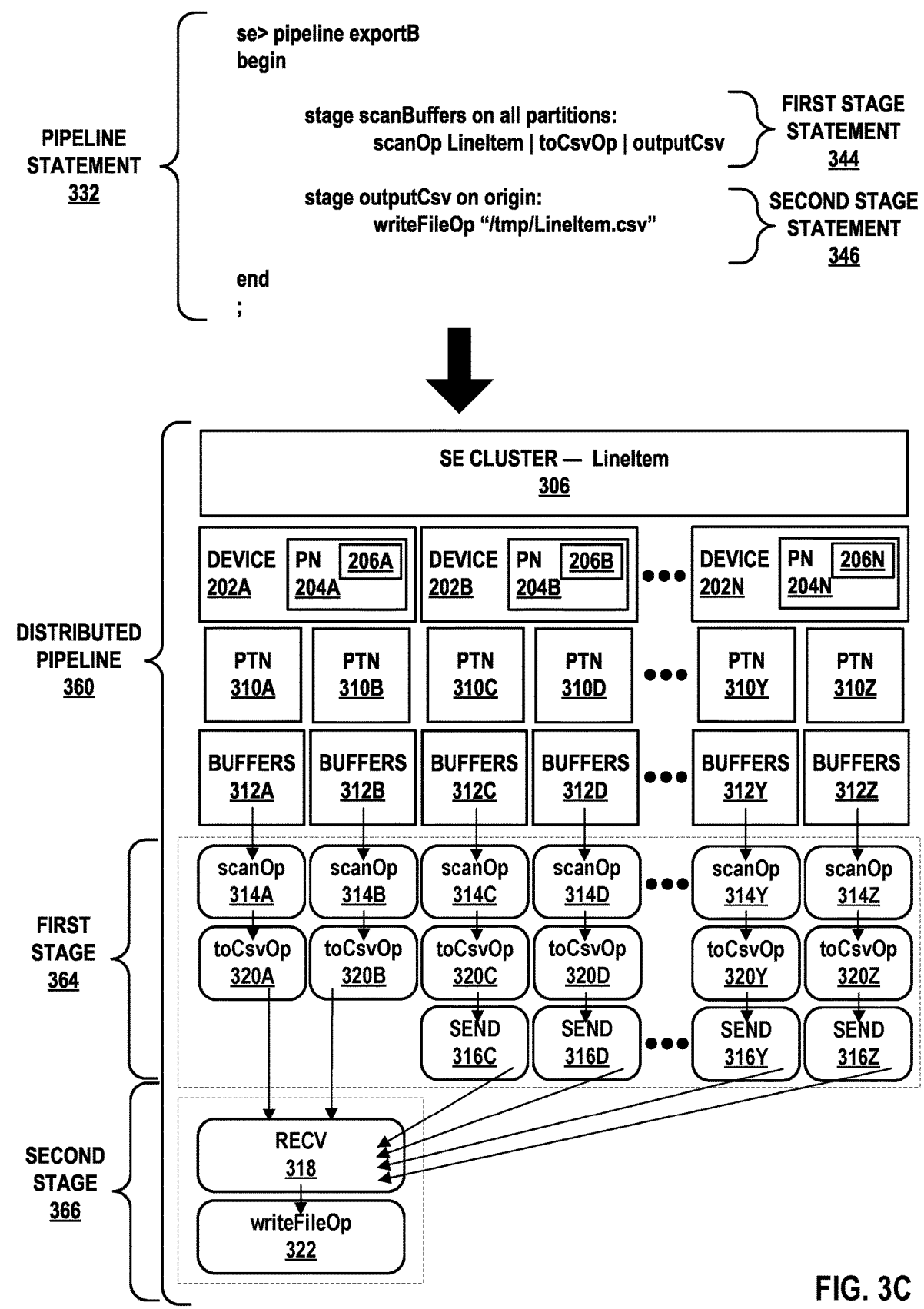

FIGS. 3A-3C are block diagrams illustrating example implementations of a distributed pipeline in greater detail, in accordance with one or more aspects of the techniques disclosed. In the example of FIG. 3A, a cluster of devices implements a table, e.g., LineItem 306, of a data structure (e.g., table) logically spans devices 202A-202N. LineItem table 306 may represent a data structure based on the Transaction Processing Performance Council (TPC) benchmark H, a relational database table, a non-relational database set of key-value pairs, a set of one or more streams, or another data structure and/or source. In this example, table 306 is divided into one or more partitions each managed by one of devices 202 and, more specifically, by one of processing nodes 204. As such, table 306 logically spans multiple processing nodes 204 and partitions 310. In this example, device 202A manages table partitions 310A and 310B, device 202B manages table partitions 310C and 310D, and device 202N manages table partitions 310Y and 310Z. For each partition, a region of physical memory storage, e.g., one or more buffers, may store data (e.g., rows) of the LineItem table 306 for that partition. The example of FIG. 3A is merely an example and may include any number of devices, partitions, buffers, etc. For instance, any one or more devices 202 may execute multiple processing nodes and any one or more of processing nodes 204 may manage one or more partitions 310.

In the example of FIG. 3A, a program of any of processing nodes 204 may receive pipeline statement 302 that defines a plurality of stages. In this example, processing node 204A may receive pipeline statement 302 including a first stage statement 324 for a corresponding first stage 334 named "scanBuffers" and specifying that the corresponding first stage 334 is to execute "on all partitions", i.e., with respect to all partitions 310. Pipeline statement 302 also includes a second stage statement 326 for a corresponding second stage named "outputCsv" and specifying that the corresponding second stage 336 is to execution "on origin" that is, in this example, the processing node 204 that receives pipeline statement 302, i.e., processing node 204A. The operations specified in first stage statement 324 ("scanOp LineItem|outputCsv") are to be executed with respect to all partitions 310 of devices 202 and the operations in second stage statement 326 (e.g., "toCsvOp|writeFileOp '/tmp/LineItem.csv'") are to be processed by processing node 204A (e.g., the processing node that received pipeline statement 302 and is "origin").

Processing nodes 204 collaborate to generate distributed pipeline 304 by configuring sub-pipelines for the stages on the processing nodes and binding first stage 334 to second stage 336 in response to the text "outputCsv" that is a reference to second stage 336 appearing as a final operation in first stage statement 324. For example, when processing pipeline statement 302, program 206A of processing node 204A may determine that there are multiple stages in pipeline statement 302. In response, the program may distribute pipeline setup specifications generated from pipeline statement 302 to the set of collaborative programs 206 executing on devices 202A-202N.

Programs 206A-206N may each generate a sub-pipeline of distributed pipeline 304 for the corresponding processing node 204 to execute for the first stage 334, and program 206A of origin processing node 204A may generate a second sub-pipeline of distributed pipeline 304 for the second stage 336.

For the first sub-pipeline for the first stage 323, each of programs 206 may orchestrate queues and generate interfaces to bind its local operations. For example, program 206A may orchestrate one or more queues to enqueue the results of scan operation 314A with respect to partition 310A for input to the next operator, send 316A. Program 206A may also orchestrate one or more queues to enqueue the results of scan operation 314B with respect to partition 310B for input to the next operator, send 316B. Program 206A may generate an input interface for scan operation 314A to read data stored in buffers 312A associated with partition 310A and an input interface for scan operation 314B to read data stored in buffers 312B associated with partition 310B. Program 206A may generate an output interface for scan operation 314A to send results of the scan operations to the one or more queues for send 316B. Program 206A may generate an output interface for scan operation 314B to send results of the scan operations to the one or more queues for send 316B. Programs 206B and 206N may configure similar queues, operators, and interfaces for corresponding buffers 312, scan operations 314, and send operations 316. Data flowing through buffers may be self-describing, not self-describing, or otherwise (e.g., structured, semi-structured, unstructured).

Send operations 316A-316Z (collectively, "send operations 316") send the results of scan operations 314 (which are the results of first stage 334 as a whole) to processing node 204A to process the operations in second stage 326. For example, program 206A may configure send operation 316A to send the output of scan operation 314A, and send operation 316B to send the output of scan operation 314B. Program 206B may configure send operation 316C to send the output of scan operation 314C, and send operation 316D to send the output of scan operation 314D. Program 206N may configure send operation 316Y to send the output of scan operation 314Y, and send operation 316Z to send the output of scan operation 314Z. Send operations 316 may be example instances of send operation 208N. Programs 206 may configure input interfaces for queues by which the send operations 316 may obtain the results from corresponding scan operations 314. Programs 206 may configure communication channels between operators for send operations 316 and respective operators for respective receive operations 318.

For the second sub-pipeline for second stage 336, program 206A of origin processing node 204A may configure a receive operation 318 to receive the results from each of devices 202B-202N. Receive operation 318 may represent multiple receive operations for multiple communications channels between processing node 204A and each of processing nodes 204 to receive data sent with send operations 316.

Program 206A may also orchestrate queues and generate interfaces for the operations to be performed by the origin processing node 204A. For example, program 206A may generate an input interface and queues by which receive operation 318 may obtain data from processing nodes 202A-202N. Program 206A may configure one or more buffers 319 to store the result data of the first stage 334 received from each of processing nodes 204 and output interfaces by which receive operation 318 may store the result data to buffer 319.

Program 206A may generate an input interface by which convert to CSV ("toCsvOp") operation 320 may read data from buffer 319. For example, toCsvOp 320 may use an input interface to read the data (e.g., in binary format) stored in buffer 319. Program 206A may process toCsvOp 320 and convert the data in binary format to CSV format. Program 206A may output the results from the toCsvOp 320 to a store to file operation ("writeFileOp") 322 (referred to as "writeFileOp 322" or "export operation 322"). Program 206A may configure an output interface or output device to which the writeFileOp 322 may send the CSV. In this case, the output device is a file "/Tmp/LineItem.csv" indicated in second stage statement 326.

FIG. 3B is a block diagram illustrating another example implementation of a distributed pipeline configured based on a pipeline statement, in accordance with techniques of this disclosure. Devices 202 of FIGS. 3A-3C are similar, but the pipeline statements processed in each Figure differ and result in different distributed pipelines. In the example of FIG. 3B, the pipeline statement 332 specifies that the convert to CSV ("toCsvOp") is included in the first stage rather than the second stage, as in FIG. 3A.

In the example of FIG. 3B, processing node 204A of device 202A receives pipeline statement 332 including a first stage statement 344 ("stage scan scanBuffers on all partitions: scanOp LineItem|toCsvOp|outputCsv") and a second stage statement 346 ("stage outputCsv on origin: writeFileOp '/tmp/LineItem.csv'"). The operations specified in first statement stage 344 ("scanOp LineItem|toCsvOp|outputCsv") are to be performed with respect to all partitions 310 and the operations specified in second stage statement 346 ('writeFileOp '/tmp/LineItem.csv'") are to be performed by origin processing node 204A (e.g., the processing node that received pipeline statement 332).

In the first stage 354 (stage "scanBuffers") corresponding to first stage statement 344, each of processing nodes 204 that manages a partition 310 performs the operation "scanOp LineItem|toCsvOp" with respect to the "LineItem" table implemented with partitions 310 and outputs the result to the second stage 356 (stage "outputCsv") corresponding to second stage statement 346 and performed by processing node 204A. Programs 206 of processing nodes 204 collaborate to generate distributed pipeline 340 by configuring the sub-pipelines of first stage 354 and second stage 356 and binding the sub-pipeline of first stage 354 to the sub-pipeline of second stage 356. For example, when processing pipeline statement 332, program 206A may determine that there are multiple stages in pipeline statement 332. In response, program 206A may compile pipeline statement 332 to generate and distribute pipeline setup specifications to the programs 206B-206N of devices 202B-202N.

As with the example in FIG. 3A, programs 206 of processing nodes 204 configure operators for executing specified operations, queues, input/output interfaces, and/or communication channels to establish distributed pipeline 340 having the operations and topology, for the distributed system of processing nodes, specified by pipeline statement 332.

As noted above, pipeline statement 332 of FIG. 3B differs from pipeline statement 302 in that the "toCsvOp" operation is located in the first stage statement 344 rather than the second stage statement 346. As a result, programs 206 configure distributed pipeline 340 so that toCsvOp 320 is located in first stage 354 rather than second stage 356. This may improve the overall processing speed and reduce the time taken for the distributed system to execute pipeline statement 332 relative to the time taken for the distributed system to execute pipeline statement 302, for the toCsvOp 320 operation is performed in parallel by multiple processing nodes 204 on distributed data in distributed pipeline 340 rather than by the just the origin processing node 204A having collected all of the ScanOp data results, as in distributed pipeline 304.

This example demonstrates a technical advantage of the techniques of this disclosure whereby a user can rapidly experiment with and intelligently compose pipeline statements according to a high-level specification language. Reordering operators within and among stage statements can lead to significant performance improvements for completing the same overall task, and the user can do such reordering by simply rearranging syntax elements within a pipeline statement, for example, rather than manually configuring individual sub-pipelines within processing nodes and an execution topology among processing nodes.

FIG. 3C is a block diagram illustrating another example implementation of a distributed pipeline. Distributed pipeline 360 configured by programs 206 is similar to the example distributed pipeline 340 illustrated in FIG. 3B, but programs 206A-206N may optimize distributed pipeline 360 for implementing pipeline statement 332 to avoid send operations 316 by processing node 204A because processing node 204A already possesses the results of toCsvOp 320A-320B that can be directly output (e.g., piped) to receive 318, also performed by processing node 204A, that is collecting all results of toCsvOps 320 from all processing nodes 204.

Figure 4:
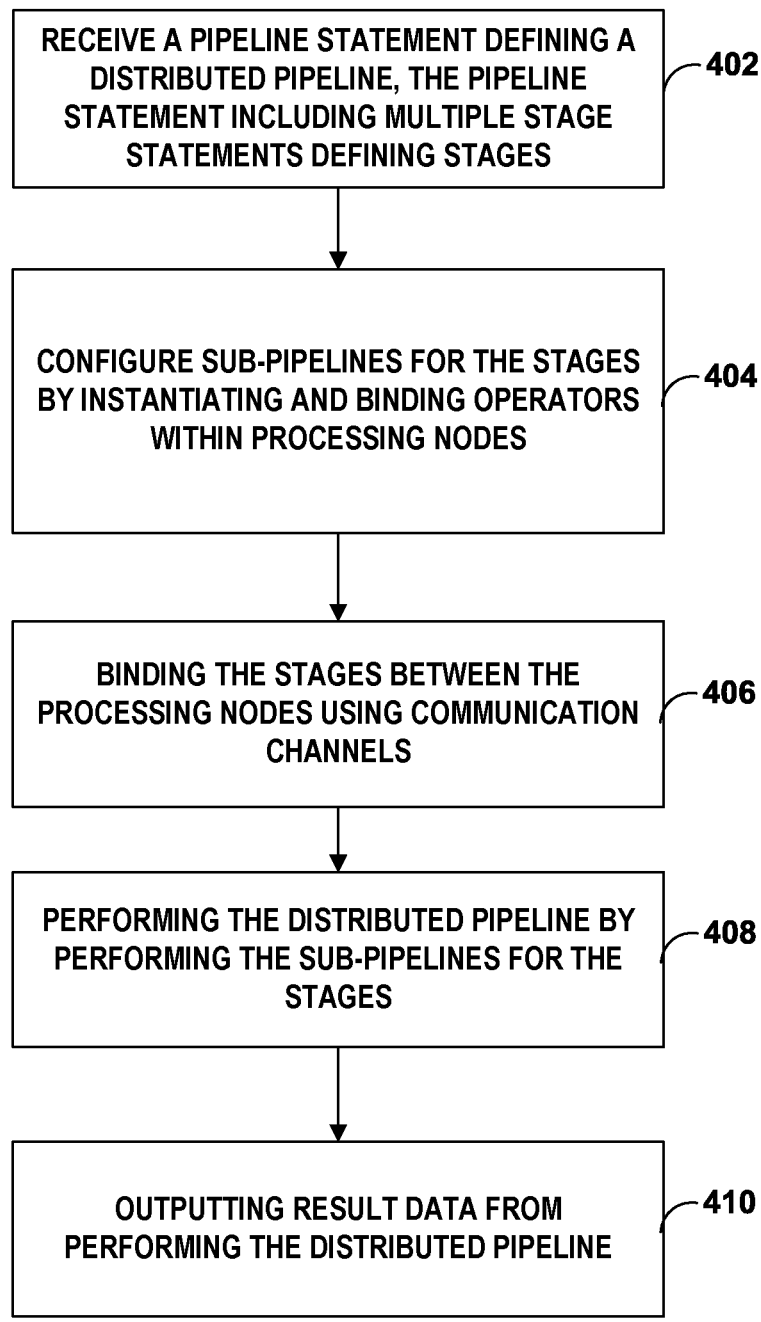
FIG. 4 is a flowchart illustrating an example operation of a distributed system, in accordance with one or more aspects of the techniques disclosed.

FIG. 4 is a flowchart illustrating an example operation of a distributed system, in accordance with one or more aspects of the techniques disclosed. FIG. 4 is described with respect to configuring and executing the example distributed pipeline 304 described in FIG. 3A.

In the example of FIG. 4, processing node 204A receives pipeline statement 302 for a distributed pipeline 304 to be processed by a plurality of computing devices (402). The pipeline statement includes multiple stage statements defining corresponding stages that each include a sub-pipeline. Processing node 204A compiles the pipeline statement to generate pipeline setup specifications 22 for the processing nodes 204 (403). The processing nodes 204 process the any of the pipeline setup specifications 22 that they obtain to configure sub-pipelines for the stages by instantiating and binding operators within processing nodes 204 for the operations of the sub-pipelines (404). In addition, based on references to other stages within stage statements, the pipeline setup specifications 22 are generated to cause processing nodes 204 to bind different sub-pipelines for different stages to one another using communication channels (406).

Once distributed pipeline 304 is configured in this way, processing nodes 204 perform distributed pipeline 304 by performing sub-pipelines for the stages, including sending result data for sub-pipelines to other processing nodes to be processed by subsequent sub-pipelines in distributed pipeline 304 (408). Processing nodes 204 output result data from performing distributed pipeline 304, e.g., to storage, interface, or other device (410).

Figure 5:
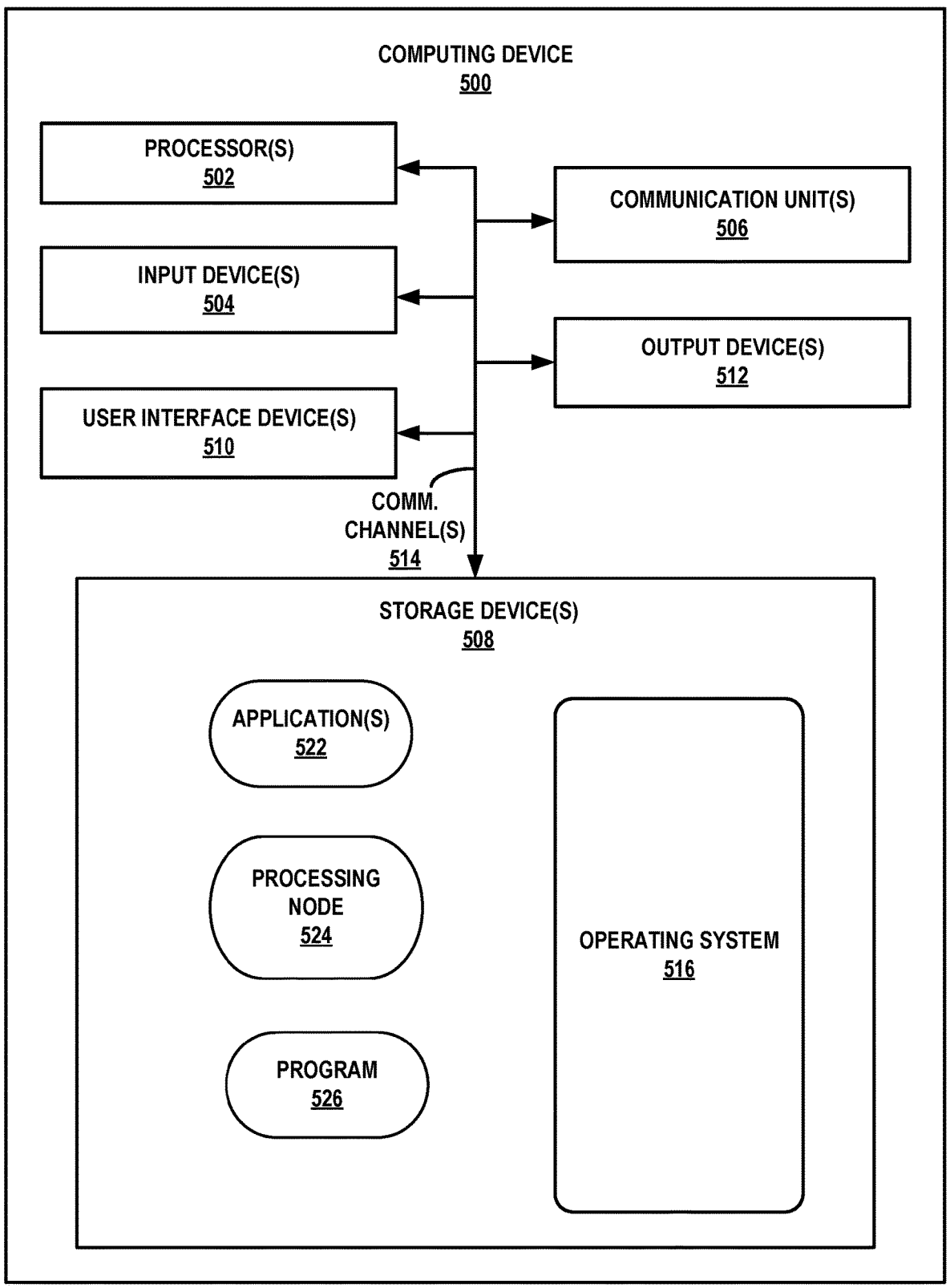
FIG. 5 is a block diagram of an example computing device that operates in accordance with one or more techniques of the present disclosure.

FIG. 5 is a block diagram of an example computing device 500 that operates in accordance with one or more techniques of the present disclosure. FIG. 5 may illustrate a particular example of a computing device that includes one or more processors 502 for executing any one of devices 6 of FIG. 1, devices 202 of FIGS. 2A-3C, or any other computing device described herein. In the example of FIG. 5, computing device 500 may represent network-enabled devices, such as servers, desktops, laptops, cloud compute nodes, mobile phones, tablets, IoT devices, such as cameras, sensors, televisions, appliances, etc. Other examples of computing device 500 may be used in other instances. Although shown in FIG. 5 as a stand-alone computing device 500 for purposes of example, a computing device may be any component or system that includes one or more processors or other suitable computing environment for executing software instructions and, for example, need not necessarily include one or more elements shown in FIG. 5 (e.g., communication units 506; and in some examples components such as storage device(s) 508 may not be in the computing device 500).

As shown in the specific example of FIG. 5, computing device 500 includes one or more processors 502, one or more input devices 504, one or more communication units 506, one or more output devices 512, one or more storage devices 508, and one or more user interface (UI) devices 510. Computing device 500, in one example, further includes one or more applications 522 and operating system 516 that are executable by computing device 500. Each of components 502, 504, 506, 508, 510, and 512 are coupled (physically, communicatively, and/or operatively) for inter-component communications. In some examples, communication channels 514 may include a system bus, a network connection, an inter-process communication data structure, or any other method for communicating data. As one example, components 502, 504, 506, 508, 510, and 512 may be coupled by one or more communication channels 514.

Processors 502, in one example, are configured to implement functionality and/or process instructions for execution within computing device 500. For example, processors 502 may be capable of processing instructions stored in storage device 508. Examples of processors 502 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 508 may be configured to store information within computing device 500 during operation. Storage device 508, in some examples, is described as a computer-readable storage medium. In some examples, storage device 508 is a temporary memory, meaning that a primary purpose of storage device 508 is not long-term storage. Storage device 508, in some examples, is described as a volatile memory, meaning that storage device 508 does not maintain stored contents when the computer is turned off. Examples of volatile memories include random access memories (RAM), dynamic random-access memories (DRAM), static random-access memories (SRAM), and other forms of volatile memories known in the art. In some examples, storage device 508 is used to store program instructions for execution by processors 502. Storage device 508, in one example, is used by software or applications running on computing device 500 to temporarily store information during program execution.

Storage devices 508, in some examples, also include one or more computer-readable storage media. Storage devices 508 may be configured to store larger amounts of information than volatile memory. Storage devices 508 may further be configured for long-term storage of information. In some examples, storage devices 508 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 500, in some examples, also includes one or more communication units 506. Computing device 500, in one example, utilizes communication units 506 to communicate with external devices via one or more networks, such as one or more wired/wireless/mobile networks. Communication units 506 may include a network interface card, such as an Ethernet card, an optical transceiver, a radio frequency transceiver, or any other type of device that can send and receive information. Other examples of such network interfaces may include 3G, 4G and Wi-Fi radios. In some examples, computing device 500 uses communication unit 506 to communicate with an external device.

Computing device 500, in one example, also includes one or more user interface devices 510. User interface devices 510, in some examples, are configured to receive input from a user through tactile, audio, or video feedback. Examples of user interface devices(s) 510 include a presence-sensitive display, a mouse, a keyboard, a voice responsive system, video camera, microphone, or any other type of device for detecting a command from a user. In some examples, a presence-sensitive display includes a touch-sensitive screen.

One or more output devices 512 may also be included in computing device 500. Output device 512, in some examples, is configured to provide output to a user using tactile, audio, or video stimuli. Output device 512, in one example, includes a presence-sensitive display, a sound card, a video graphics adapter card, or any other type of device for converting a signal into an appropriate form understandable to humans or machines. Additional examples of output device 512 include a speaker, a cathode ray tube (CRT) monitor, a liquid crystal display (LCD), or any other type of device that can generate intelligible output to a user.

Computing device 500 may include operating system 516. Operating system 516, in some examples, controls the operation of components of computing device 500. For example, operating system 516, in one example, facilitates the communication of one or more applications 522 with processors 502, communication unit 506, storage device 508, input device 504, user interface device 510, and output device 512. Application 522 may also include program instructions and/or data that are executable by computing device 500.

Processing node 524 may include instructions for causing computing device 500 to run one or more programs 526 to perform the techniques described in the present disclosure. Programs 526 may represent an example instance of any of programs 9 of FIG. 1 or programs 206 of FIGS. 2-3C. For example, computing device 500 may receive a pipeline statement via one or more user interface devices 510 or one or more of input devices 504 and sends the pipeline statement for processing by program 526 of processing node 524. Program 526 may include instructions that cause computing device 500 to assist with configuring a distributed pipeline on a distributed system in accordance with techniques of this disclosure. For example, program 526 may interpret various syntax elements of a pipeline statement to generate a distributed pipeline that binds operations for sub-pipelines within processing nodes for stages and that binds sub-pipelines for different stages together, sometimes via communication channels between processing nodes. For example, program 526 may interpret the syntax of a pipeline statement and determine that the pipeline statement includes a first stage in which all processing nodes perform one or more operations, and a second stage in which the origin node performs a different one or more operations. Program 526 may generate, from the pipeline statement, pipeline setup specifications and distribute the pipeline setup specifications via communication unit(s) 506 other processing nodes.

Program 526 may generate a pipeline setup specification for processing node 524. In some cases, computing device 500 receives a pipeline setup specification, via communication unit(s) 506 or input device(s), generated by another processing node. In any event, program 526 processes the pipeline setup specification to instantiate operators and bind operators together using input/output channels to generate a sub-pipeline of the distributed pipeline, and in some cases to bind the sub-pipeline to another sub-pipeline performed by another computing device.

As one example, program 526 may issue low-level calls to operating system 516 to allocate memory (e.g., queues) for the local operations of a sub-pipeline. Program 526 may also configure interfaces between the operations and the queues. Program 526 may also generate low-level calls to the kernel to configure a receive operator to receive results of operations processed by other devices.

Once any specified sub-pipelines and communication channels are configured, programs 526 may perform the sub-pipelines by executing operators for the corresponding operations of the sub-pipelines. In this way, computing device 500 operates as part of a distributed system to configure and execute a distributed pipeline.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units or engines is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

What is claimed is:

1. A distributed computing system comprising:
a plurality of computing devices connected by a packet-based network, each of the plurality of computing devices representing or executing one or more of a plurality of processing nodes, the plurality of computing devices configured to obtain a pipeline statement defining a distributed pipeline, the pipeline statement comprising a first stage statement (1) defining a first stage to include a first sub-pipeline of the distributed pipeline, the first sub-pipeline comprising an ordered list of a first plurality of operations, each of the first plurality of operations to be performed by a corresponding, different process of a first processing node of the plurality of processing nodes and (2) including a syntax element identifying a second stage as a recipient for result data of the first sub-pipeline of the first stage, the pipeline statement also comprising a second stage statement defining the second stage to include a second sub-pipeline of the distributed pipeline, the second sub-pipeline comprising an ordered list of a second plurality of operations, each of the second plurality of operations to be performed by a corresponding, different process of a second processing node of the plurality of processing nodes,
wherein a first computing device of the plurality of computing devices comprises the first processing node, the first processing node comprising processing circuitry and configured to, based at least on a first pipeline setup specification generated by processing the pipeline statement, configure the first sub-pipeline in the first processing node by instantiating respective, different first processes for the first plurality of operations defined by the first stage statement to perform the first plurality of operations,
wherein to configure the first sub-pipeline, the first processing node is configured to bind at least one pair of the first processes using one or more input/output channels,
wherein the first processing node is further configured to, based on the syntax element, send result data of the first sub-pipeline of the first stage to the second sub-pipeline of the second stage, and
wherein the second computing device comprises the second processing node, the second computing device different from the first computing device, the second processing node comprising processing circuitry and configured to:
based at least on a second pipeline setup specification generated by processing the pipeline statement, configure the second sub-pipeline in the second processing node by instantiating respective, different second processes for the second plurality of operations defined by the second stage statement to perform the second plurality of operations; and input, to the second sub-pipeline in the second processing node, the result data of the first sub-pipeline of the first stage.

2. The distributed computing system of claim 1, wherein the first sub-pipeline in the first processing node comprises an operating system pipe to bind together the first plurality of operations, and
wherein the second sub-pipeline in the second processing node comprises an operating system pipe to bind together the second plurality of operations.

3. The distributed computing system of claim 1, further comprising:
a compiler computing device configured to process the pipeline statement to generate the first pipeline setup specification and the second pipeline setup specification.

4. The distributed computing system of claim 3, wherein the compiler computing device comprises the second processing node.

5. The distributed computing system of claim 1, wherein the pipeline statement comprises human-readable text.

6. The distributed computing system of claim 1,
wherein the second stage statement includes a stage identifier for the second stage, and wherein the syntax element identifying the second stage as a recipient for result data of the first sub-pipeline of the first stage comprises the stage identifier for the second stage as an operation of the first sub-pipeline, and wherein the distributed computing system is configured to, based on the syntax element, generate the first pipeline setup specification to configure the first sub-pipeline in the first processing node to send result data of the first sub-pipeline in the first processing node to the second processing node.

7. The distributed computing system of claim 1,
wherein the plurality of computing devices comprises a compiler computing device configured to obtain the pipeline statement and to process the pipeline statement to generate the first pipeline setup specification and the second pipeline setup specification.

8. The distributed computing system of claim 7, wherein the compiler computing device comprises the second processing node.

9. The distributed computing system of claim 1,
wherein a final process of the first processes comprises a send operator to send, via a communication channel, the result data for the first sub-pipeline to the second sub-pipeline of the second stage.

10. The distributed computing system of claim 1, further comprising:
a third processing node configured to, based at least on a third pipeline setup specification generated from the pipeline statement, configure the first sub-pipeline in the third processing node to send result data of the first sub-pipeline in the third processing node to the second processing node.

11. The distributed computing system of claim 1,
wherein the second processing node is configured to, based at least on the syntax element and the second pipeline setup specification generated by processing the pipeline statement, configure the first sub-pipeline in the second processing node to provide result data of the first sub-pipeline in the second processing node as input to the second sub-pipeline in the second processing node.

12. The distributed computing system of claim 1,
wherein the first stage statement defines the first stage to specify a first one or more processing nodes to perform the first sub-pipeline, the first one or more processing nodes including the first processing node, and
wherein the distributed computing system is configured to, based on the first stage statement specifying a first one or more processing nodes, generate the first pipeline setup specification for the first processing node to configure the first sub-pipeline in the first processing node.

13. The distributed computing system of claim 12,
wherein the first stage statement includes one or more syntax elements that specify the first one or more processing nodes to perform the first sub-pipeline, and
wherein the distributed computing system is configured to, based on the one or more syntax elements, generate a pipeline setup specification for configuring the first sub-pipeline in each of the first one or more processing nodes.

14. The distributed computing system of claim 12,
wherein the second stage statement defines the second stage to specify a second one or more processing nodes to perform the second sub-pipeline, the second one or more processing nodes including the second processing node, and
wherein the distributed computing system is configured to, based on the second stage statement, generate the second pipeline setup specification for the second processing node to configure the second sub-pipeline in the second processing node.

15. The distributed computing system of claim 1, wherein the first stage statement defines the first stage to specify first one or more partitions of a data structure with respect to which the first sub-pipeline is to be performed.

16. The distributed computing system of claim 1, wherein each of the first processing node and the second processing node comprises one of a bare metal server, a virtual machine, a container, a shell program, or a storage engine.

17. The distributed computing system of claim 1,
wherein the first processing node is configured to execute the first sub-pipeline in the first processing node to generate first result data and to send the first result data to the second processing node via a communication channel,
wherein the second processing node is configured to execute the second sub-pipeline in the second processing node to process the first result data to generate second result data and to output the second result data.

18. A method comprising:
receiving, by a compiler device in communication with a plurality of servers connected by a network, a command comprising syntax elements defining a plurality of stages, wherein each of the stages comprises a plurality of operations to be processed by corresponding, different processes executing on any one of the plurality of servers, the command further comprising syntax elements defining a pipeline topology for a distributed pipeline, the pipeline topology including an intra-server branch for the plurality of operations of each stage of the plurality of stages and an inter-server branch that binds operations of different stages of the plurality of stages, and wherein a particular syntax element identifies a second stage of the plurality of stages as a recipient for result data of a first stage of the plurality of stages;

distributing, by the compiler device to each of the plurality of servers, configuration data generated from the command to implement the distributed pipeline;

configuring, in each server of the plurality of servers and based on the configuration data, a first sub-pipeline for a first stage of the distributed pipeline, wherein the first sub-pipeline configured in the server binds, using one or more input/output channels, the plurality of operations of the first stage of the plurality of stages, the bound operations of the first stage to be processed by corresponding, different processes executing on the server, and wherein the particular syntax element causes each server of the plurality of servers to output result data of the first sub-pipeline configured in the server to a particular server of the plurality of servers that is configured with a second sub-pipeline of the distributed pipeline; and configuring, in the particular server of the plurality of servers and based on the configuration data, a second sub-pipeline for a second stage of the distributed pipeline, wherein the second sub-pipeline configured in the particular server binds the plurality of operations of the second stage of the plurality of stages to the plurality of operations of the first stage configured in each server of the plurality of servers.

19. A method comprising: obtaining, by a plurality of computing devices connected by a network, each of the plurality of computing devices representing or executing one or more of a plurality of processing nodes, a pipeline statement defining a distributed pipeline, the pipeline statement comprising a first stage statement (1) defining a first stage to include a first sub-pipeline of the distributed pipeline, the first sub-pipeline comprising an ordered list of a first plurality of operations, each of the first plurality of operations to be performed by a corresponding, different process of a first processing node of the plurality of processing nodes and (2) including a syntax element identifying a second stage as a recipient for result data of the first sub-pipeline of the first stage, the pipeline statement also comprising a second stage statement defining the second stage to include a second sub-pipeline of the distributed pipeline, the second sub-pipeline comprising an ordered list of a second plurality of operations, each of the second plurality of operations to be performed by a corresponding, different process of a second processing node of the plurality of processing nodes, wherein a first computing device of the plurality of computing devices comprises the first processing node, and wherein a second computing device of the plurality of computing devices comprises the second processing node, the second computing device different from the first computing device;

configuring, based at least on a first pipeline setup specification generated from the pipeline statement, the first sub-pipeline in the first processing node by instantiating respective, different first processes for the first plurality of operations defined by the first stage statement to perform the first plurality of operations, wherein configuring the first sub-pipeline comprises binding at least one pair of the first processes using one or more input/output channels;

configuring, based on the syntax element, the first processing node to send result data of the first sub-pipeline of the first stage to the second sub-pipeline of the second stage; and configuring, based at least on a second pipeline setup specification generated from the pipeline statement, the second sub-pipeline in the second processing node by instantiating respective, different second processes for the second plurality of operations defined by the second stage statement to perform the second plurality of operations and to input, to the second sub-pipeline in the second processing node, the result data of the first sub-pipeline of the first stage.

\* \* \* \* \*